United States Patent
Boyd et al.

(10) Patent No.: US 10,557,973 B2
(45) Date of Patent: Feb. 11, 2020

(54) BRIGHTNESS ENHANCING FILM WITH EMBEDDED DIFFUSER

(71) Applicant: 3M INNOVATIVE PROPERTIES COMPANY, St. Paul, MN (US)

(72) Inventors: Gary T. Boyd, Woodbury, MN (US); Steven H. Kong, Woobury, MN (US); Tri D. Pham, Woodbury, MN (US); Qingbing Wang, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 725 days.

(21) Appl. No.: 14/436,770

(22) PCT Filed: Dec. 5, 2013

(86) PCT No.: PCT/US2013/073276
§ 371 (c)(1),
(2) Date: Apr. 17, 2015

(87) PCT Pub. No.: WO2014/093119
PCT Pub. Date: Jun. 19, 2014

(65) Prior Publication Data
US 2016/0146982 A1 May 26, 2016

Related U.S. Application Data

(60) Provisional application No. 61/737,220, filed on Dec. 14, 2012.

(51) Int. Cl.
G02B 5/02 (2006.01)
G02B 5/04 (2006.01)
G02B 5/30 (2006.01)

(52) U.S. Cl.
CPC ......... *G02B 5/0221* (2013.01); *G02B 5/0278* (2013.01); *G02B 5/045* (2013.01); *G02B 5/3083* (2013.01)

(58) Field of Classification Search
None
See application file for complete search history.

(56) References Cited

U.S. PATENT DOCUMENTS 5,917,664 A 6/1999 O'Neill et al.
7,480,097 B2 1/2009 Nagahama
(Continued)

FOREIGN PATENT DOCUMENTS

CN 101726774 6/2010
CN 202256749 5/2012
(Continued)

OTHER PUBLICATIONS

International Search Report for PCT International Application No. PCT/US2013/073276 dated Feb. 26, 2014, 4 pages.

*Primary Examiner* — Darryl J Collins
*Assistant Examiner* — Journey F Sumlar
(74) *Attorney, Agent, or Firm* — Clifton F. Richardson; Daniel J. Iden

(57) ABSTRACT

Brightness enhancing films with embedded diffusers are described. More specifically, films including a birefringent substrate, a prismatic layer carried by the substrate having linear prisms, and an embedded structured surface disposed between the substrate and the prismatic layer are disclosed. The embedded structured surface may include closely-packed structures. Processes for producing embedded structured surfaces having particular topographies are also disclosed.

20 Claims, 24 Drawing Sheets

(56) References Cited

U.S. PATENT DOCUMENTS

| | | | |
|---|---|---|---|
| 8,530,572 B2 | 9/2013 | Kolb et al. | |
| 2009/0073564 A1* | 3/2009 | Lin | G02B 5/0221 |
| | | | 359/599 |
| 2010/0271840 A1 | 10/2010 | Hamada | |
| 2010/0302479 A1 | 12/2010 | Aronson | |
| 2011/0280004 A1 | 11/2011 | Shimada | |
| 2012/0113622 A1 | 5/2012 | Aronson | |
| 2012/0147593 A1* | 6/2012 | Yapel | G02B 5/0221 |
| | | | 362/97.1 |

FOREIGN PATENT DOCUMENTS

| | | |
|---|---|---|
| JP | 8-335044 | 12/1996 |
| KR | 2011-0102838 | 9/2011 |
| WO | WO 2010-120864 | 10/2010 |
| WO | WO 2010-014126 | 12/2010 |
| WO | WO 2011-056475 | 5/2011 |
| WO | WO 2011-088161 | 7/2011 |
| WO | WO 2011-149715 | 12/2011 |
| WO | WO 2013-158475 | 10/2013 |
| WO | WO 2014-081693 | 5/2014 |

* cited by examiner 200 um

BRIGHTNESS ENHANCING FILM WITH EMBEDDED DIFFUSER

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Most LCDs include a liquid crystal panel and an extended area light source, often referred to as a backlight, for illuminating the liquid crystal panel. Backlights typically include one or more lamps and a number of light management films such as, for example, light guides, mirror films, light redirecting films (including brightness enhancement films), retarder films, light polarizing films, and diffuser films. Diffuser films are typically included to hide optical defects and improve the brightness uniformity of the light emitted by the backlight.

Some diffusing films use a beaded construction to provide the light diffusion. For example, an optical film may have a layer of microscopic beads adhered to one surface of the film, and the refraction of light at the bead surfaces may operate to provide the light diffusion characteristics of the film. Examples of beaded diffusing films include: a linear prismatic brightness enhancement film with a matte surface of sparsely distributed beads, sold under the product designation TBEF2-GM by 3M Company, referred to herein as a "sparsely distributed beaded diffuser" or "SDB diffuser"; a reflective polarizing film with a beaded diffuser layer, sold under the product designation DBEF-D3-340 by 3M Company, referred to herein as a "densely-packed beaded diffuser" or "DPB diffuser"; and a diffusing cover sheet included in a commercial display device, referred to herein as a "commercial cover sheet diffuser" or "CCS diffuser". FIG. 1 shows a scanning electron microscope (SEM) image of a representative portion of the beaded surface of a CCS diffuser, and FIG. 1A shows an SEM image of such surface in cross-section. FIGS. 2 and 3 show SEM images of representative portions of a DPB diffuser and a SDB diffuser, respectively.

Other diffusing films use a structured surface other than a beaded layer to provide the light diffusion, where the structured surface is made by microreplication from a structured tool. Examples of such diffusing films include: films (referred to herein as "Type I Microreplicated" diffusing films) with rounded or curved structures microreplicated from a tool having corresponding structures made by removing material from the tool with a cutter, as described in US 2012/0113622 (Aronson et al.), US 2012/0147593 (Yapel et al.), WO 2011/056475 (Barbie), and WO 2012/0141261 (Aronson et al.); and films (referred to herein at "Type II Microreplicated" diffusing films) with flat-faceted structures microreplicated from a tool having corresponding structures made by an electroplating process, as described in US 2010/0302479 (Aronson et al.). An SEM image of a representative portion of the structured surface of a Type I Microreplicated diffusing film is shown in FIG. 4, and a similar image of a Type II Microreplicated diffusing film is shown in FIG. 5. Still other microreplicated diffusing films include films in which a tool surface is made to be structured by a sandblasting procedure, and the structured surface is then imparted to the film by microreplication from the tool. See e.g. U.S. Pat. No. 7,480,097 (Nagahama et al.).

SUMMARY

In one aspect, the present description relates to an optical film. The optical film includes a birefringent substrate and a prismatic layer carried by the substrate, the prismatic layer having a major surface comprising a plurality of side by side linear prisms extending along a same prism direction. The optical film also includes an embedded structured surface disposed between the substrate and the prismatic layer including closely-packed structures arranged such that ridges are formed between adjacent structures, the structures being limited in size along two orthogonal in-plane directions. The embedded structured surface has a topography characterizable by a first and second Fourier power spectrum associated with respective first and second orthogonal in-plane directions, and to the extent the first Fourier power spectrum includes one or more first frequency peak not corresponding to zero frequency and being bounded by two adjacent valleys that define a first baseline, any such first frequency peak has a first peak ratio of less than 0.9, the first peak ratio being equal to an area between the first frequency peak and the first baseline divided by an area beneath the first frequency peak. Further, to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak. The embedded structured surface is characterized by a total ridge length per unit area in plan view of less than 200 $mm/mm^2$.

In another aspect, the present description relates to an optical film that includes a birefringent substrate and a prismatic layer carried by the substrate, the prismatic layer having a major surface comprising a plurality of side by side linear prisms extending along a same prism direction. The optical film also includes an embedded structured surface disposed between the substrate and the prismatic layer including closely-packed structures, the embedded structured surface defining a reference plane and a thickness direction perpendicular to the reference plane. The embedded structured surface has a topography characterizable by a first and second Fourier power spectrum associated with respective first and second orthogonal in-plane directions, and to the extent the first Fourier power spectrum includes one or more first frequency peak not corresponding to zero frequency and being bounded by two adjacent valleys that define a first baseline, any such first frequency peak has a first peak ratio of less than 0.9, the first peak ratio being equal to an area between the first frequency peak and the first baseline divided by an area beneath the first frequency peak. Further, to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak. The closely-packed structures are characterized by equivalent circular diameters (ECDs) in the reference plane and mean heights along the thickness direction and an average aspect ratio of each structure equals the mean height of the structure divided by the ECD of the structure. An average aspect ratio of the structures is less than 0.15.

In yet another aspect, the present disclosure relates to an optical film including a birefringent substrate and a prismatic layer carried by the substrate, the prismatic layer having a major surface including a plurality of side by side linear prisms extending along a same prism direction. The optical film also includes an embedded structured surface disposed between the substrate and the prismatic layer including closely-packed structures having curved base surfaces. The embedded structured surface has a topography characterizable by a first and second Fourier power spectrum associated with respective first and second orthogonal in-plane directions, and to the extent the first Fourier power spectrum includes one or more first frequency peak not corresponding to zero frequency and being bounded by two adjacent valleys that define a first baseline, any such first frequency peak has a first peak ratio of less than 0.9, the first peak ratio being equal to an area between the first frequency peak and the first baseline divided by an area beneath the first frequency peak. Further, to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak. The embedded structured surface provides an optical have of less than 95%.

In another aspect, the present disclosure relates to an optical film including a birefringent substrate and a prismatic layer carried by the substrate, the prismatic layer having a major surface including a plurality of side by side linear prisms extending along a same prism direction. The optical film also includes an embedded structured surface disposed between the substrate and the prismatic layer including closely-packed structures. The embedded structured surface has a topography characterizable by a first and second Fourier power spectrum associated with respective first and second orthogonal in-plane directions, and to the extent the first Fourier power spectrum includes one or more first frequency peak not corresponding to zero frequency and being bounded by two adjacent valleys that define a first baseline, any such first frequency peak has a first peak ratio of less than 0.9, the first peak ratio being equal to an area between the first frequency peak and the first baseline divided by an area beneath the first frequency peak. Further, to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak. The embedded structured surface provides an optical haze in a range from 10 to 60% and an optical clarity in a range from 10 to 40%.

In another aspect, the present disclosure relates to an optical film including a birefringent substrate and a prismatic layer carried by the substrate, the prismatic layer having a major surface including a plurality of side by side linear prisms extending along a same prism direction. The optical film also includes an embedded structured surface disposed between the substrate and the prismatic layer including larger first structures and smaller second structures, the first and second structures both being limited in size along two orthogonal in-plane directions. The first structures are non-uniformly arranged on the embedded structured surface and the second structures are closely packed and non-uniformly dispersed between the first structures. An average size of the first structures is greater than 15 microns and an average size of the second structures is less than 15 microns.

In yet another aspect, the present disclosure related to an optical film including a birefringent substrate and a prismatic layer carried by the substrate, the prismatic layer having a major surface including a plurality of side by side linear prisms extending along a same prism direction. The embedded structured surface is made by microreplication from a tool structured surface, the tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

DETAILED DESCRIPTION

Figure 6:
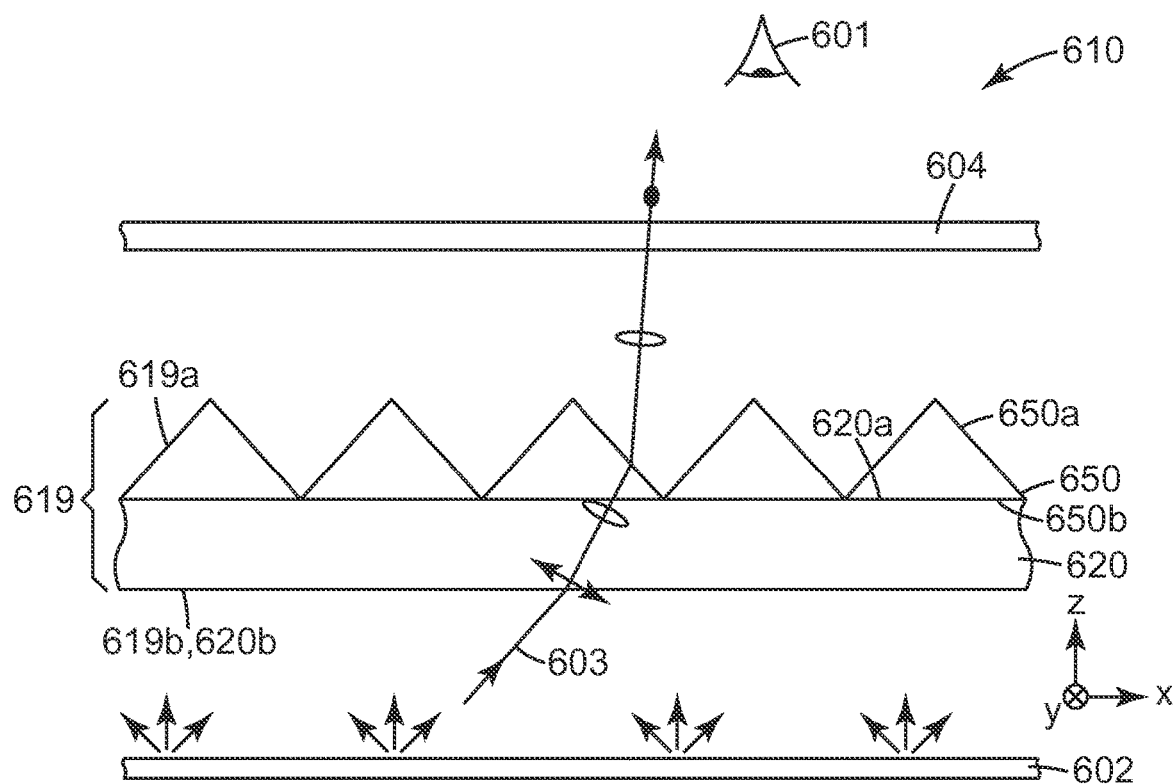
FIG. 6 is a schematic side or sectional view of an optical system that includes a microreplicated optical film having a birefringent substrate.

In FIG. 6, an optical system 610 includes a microreplicated optical film 619 disposed between an extended light source 602, such as a planar light guide with an extended output surface that emits white light, and a polarizer 604. The optical system 610 may be an optical display, backlight, or similar system, and it may include other components that are not shown in the figure, such as a liquid crystal panel and additional polarizers, diffusers, retarders, and/or other optical films or components. For purposes of the present description, we ignore such other components for ease of explanation. The optical film 619, which has a front major surface 619a and a back or rear major surface 619b, is shown to be constructed from a substrate 620 that carries a prismatic layer 650, although other layer configurations may also be used. The substrate 620 may be said to carry the prismatic layer 650 even in cases where one or more intervening layers physically connect the substrate to the prismatic layer. The prismatic layer 650 may be made by casting and curing a polymer composition onto a polymer film substrate 620 using a micropatterned tool. The tool is configured so that a first major surface 650a of the prismatic layer 650, which coincides with the front major surface 619a of the film 619, is microstructured replica of the tool, with distinct faces or facets that form an array of linear prisms. Besides casting-and-curing, other known manufacturing techniques can also be used to form the microstructured surface 650a, such as embossing, etching, and/or other known techniques. A second major surface 650b of the prismatic layer 650 coincides with a first major surface 620a of the substrate 620. A second major surface 620b of the substrate 620 coincides with the back major surface 619b of the film 619.

A Cartesian x-y-z coordinate system is included in the figure for reference purposes. The film 619 extends generally parallel to the x-y plane, and an optical axis of the system 610 may correspond to the z-axis. Each of the prisms of the structured surface extends in a generally linear direction, at least in plan view, parallel to the y-axis. The array of linear prisms refracts light in such a way that the on-axis brightness or luminance of the system is increased, compared to the same system without the film 619.

The substrate 620 that carries the prismatic layer 650 is birefringent. The birefringence may be an intentional design feature, or it may be unintentional. Films made from polyethylene terephthalate (PET), for example, can be economically made to have desirable mechanical and optical properties for use in optical film applications, but films made from PET may exhibit non-negligible amounts of birefringence. The birefringence may be substantially spatially uniform, i.e., the birefringence at one position within the substrate may be substantially the same as the birefringence at other positions within the substrate. The birefringence is typically characterized at least by an in-plane birefringence. That is, if the substrate has refractive indices nx, ny, nz for light polarized along the x-, y-, and z-axes, respectively, then a significant difference exists between the in-plane refractive indices nx and ny. The x- and y-directions may correspond, for example, to cross-web and down-web directions of a polymer film. The magnitude of nx-ny may typically be at least 0.01, or 0.02, or 0.03. The question of whether a particular refractive index difference is significant can depend on the thickness of the substrate: a small refractive index difference may be negligible for a thin substrate, but significant for a thicker substrate.

In the figure, an arbitrary light ray 603 is shown traveling from the light source 602 to an observer 601. Following this light ray, we see that it is refracted at the major surface 620b (619b), propagates through the substrate 620, is refracted again at the major surface 620a (650b), propagates through the prismatic layer 650, is refracted again at the major surface 650a (619a), travels to the polarizer 604, and one polarization component of the ray passes through the polarizer and travels on to the observer 601. The ray 603 is assumed to be unpolarized as it leaves the light source 602 and before it strikes the film 619. When it strikes the air/substrate interface at major surface 620b, it becomes partially polarized because orthogonal s- and p-polarization states are in general transmitted (and reflected) differently, depending on the angle of incidence and the refractive indices of the substrate. The reflected light components are not shown in FIG. 6 for ease of explanation. A double-headed arrow is superimposed on the ray 603 near the surface 620b to indicate the partial polarization as the light ray 603 begins its path through the substrate 620. As the ray 603 propagates through the substrate 620 toward the surface 620a, its state of partial polarization is, in general, changed due to the birefringence of the substrate 620. This change in polarization state is dependent not only on the amount of birefringence (and the thickness) of the substrate, but also on the angle of propagation of the light ray and the wavelength of the light ray. The changed polarization state is depicted in the drawing as a small ellipse superimposed on the ray 603 near the surface 620a. The light ray with its modified polarization state then is refracted by the prism layer 650, and the polarization component that is aligned with the pass axis of the polarizer 604 passes through the polarizer 604 and to the observer 601.

As mentioned above, the change in polarization state occurring within the substrate 620 depends on the wavelength of the light. This is so even if the substrate material exhibits no dispersion whatsoever. As a result, light rays of different wavelengths that follow the same or nearly the same path through the system 610, such as the path traced out by ray 603, will in general be transmitted in different relative amounts to the observer 601. The relative amounts will depend on the direction of propagation of the light ray, and we assume that a range or cone of propagation directions are present as a result of the source 602 emitting light over a significant angular range, e.g. in a Lambertian distribution or in another suitable angular distribution.

Figure 1:
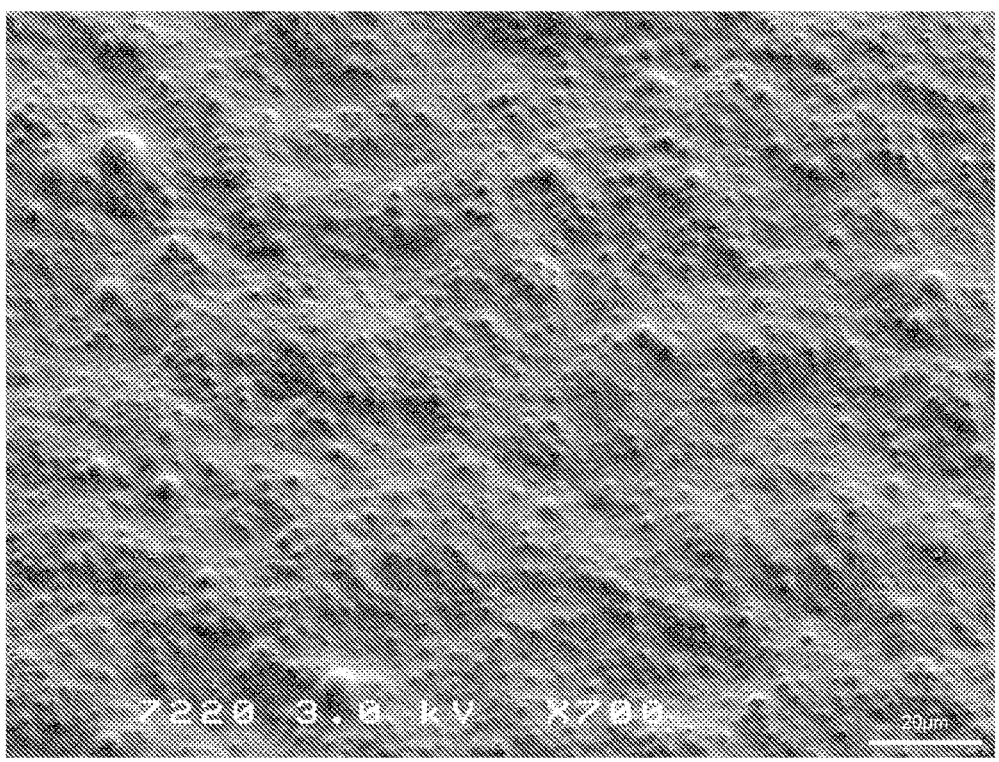
FIG. 1 is an SEM image of a portion of the beaded surface of a CCS diffuser (optical haze=72%, optical clarity=9.9%)
Figure 1A:
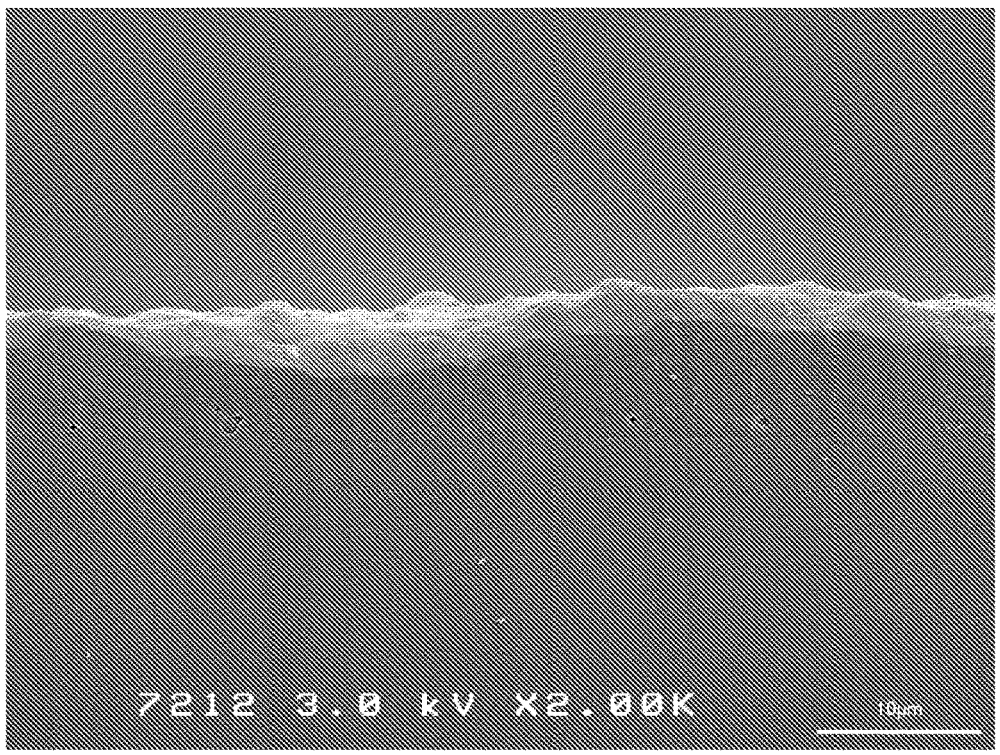
FIG. 1A is an SEM image of such surface in cross section.
Figure 2:
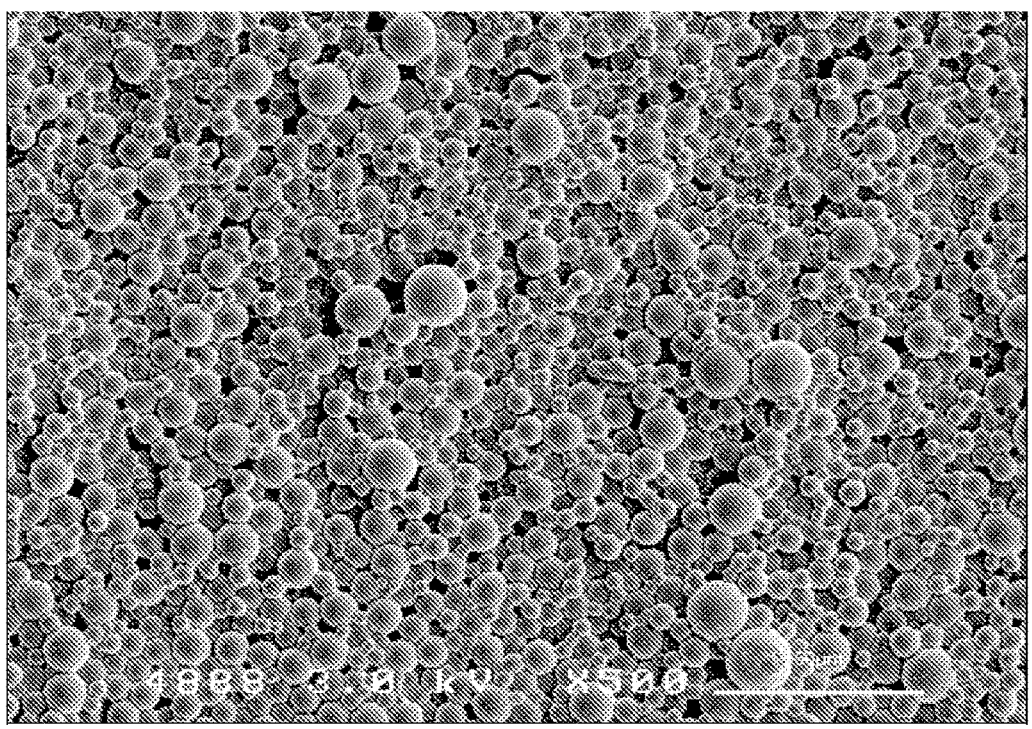
FIG. 2 is an SEM image of a portion of the beaded surface of a DPB diffuser (optical haze=97.5%, optical clarity=5%).
Figure 3:
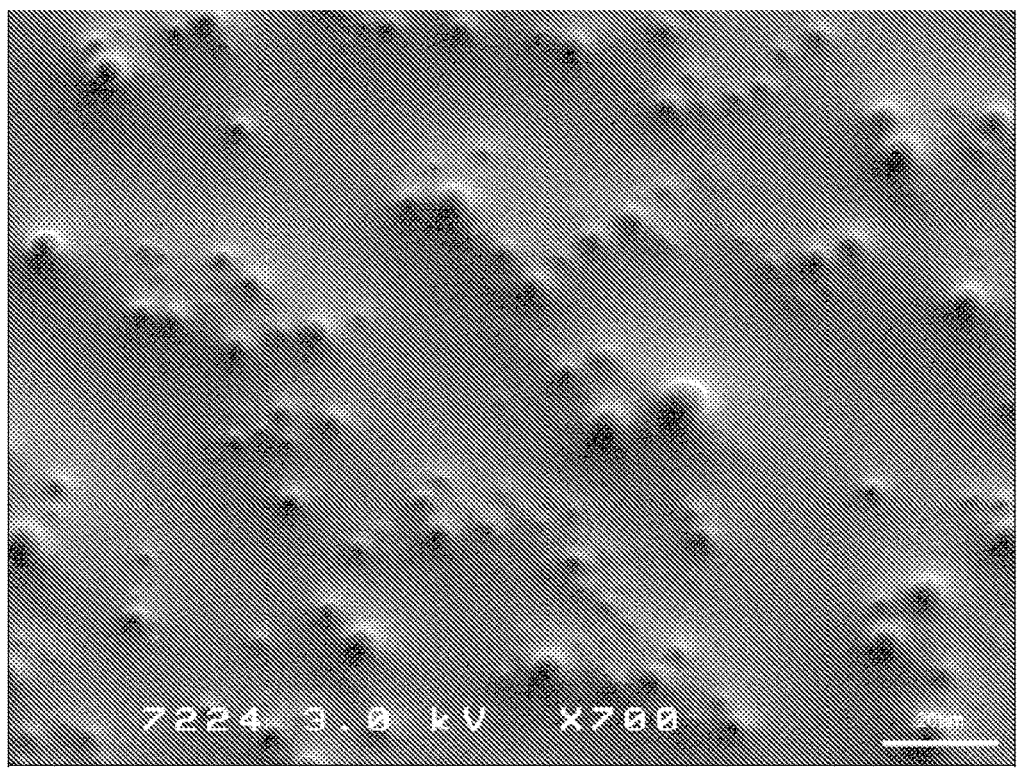
FIG. 3 is an SEM image of a portion of the beaded surface of an SDB diffuser (optical haze=67%, optical clarity=30%).

The prisms in FIG. 6 and in other figures below are shown as having nominally the same geometry including height, width, and apex angle. This is primarily for simplicity of illustration. In general, unless otherwise stated, the prisms of the prismatic layer may have any of a wide variety of configurations, as suggested by FIG. 2.

Figure 7:
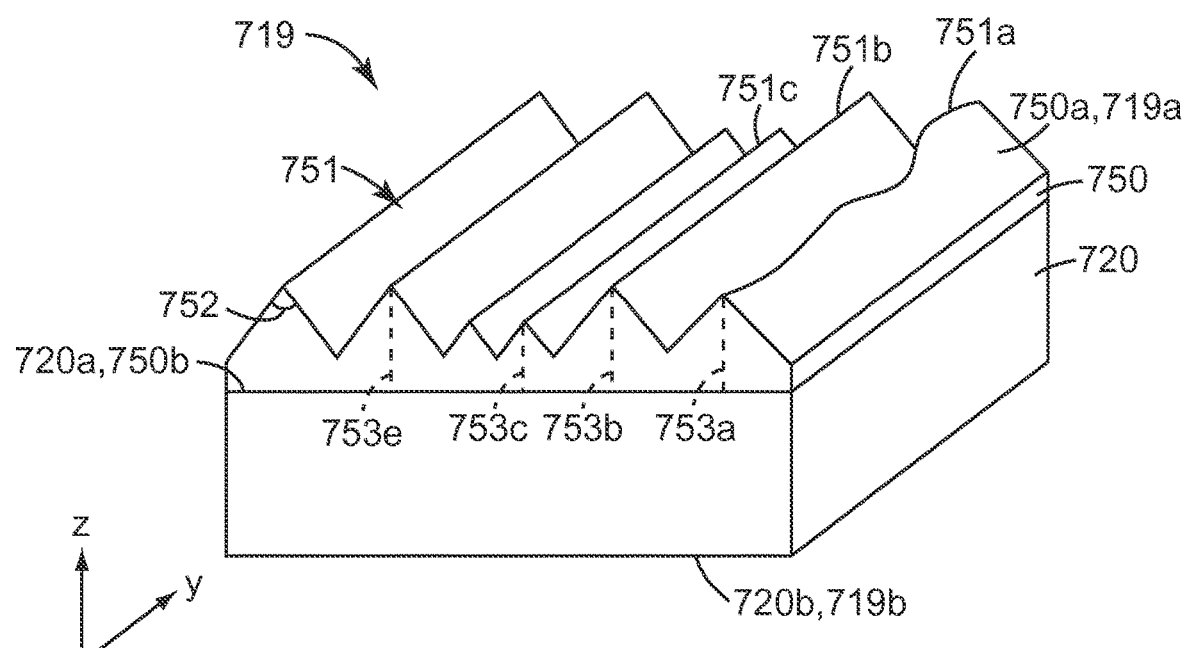
FIG. 7 is a schematic perspective view of a microreplicated optical film having an array of linear prisms, the figure demonstrating various prism configurations that may be used.

In FIG. 7, a microreplicated optical film 719 is shown that may function as a brightness enhancement film in a display, backlight, or other system. The optical film 719 includes an array of linear prisms or microstructures 751 for improving brightness. The optical film 719 includes a first major or structured surface 719a that includes a plurality of microstructures or linear prisms 751 that extend along the y-direction. The film 719 includes a second major surface 719b that is opposite the first major or structured surface 719a.

The film 719 includes a substrate layer 720 that includes a first major surface 720a and an opposing second major surface 720b, which coincides with major surface 719b. Optical film 719 includes a prismatic layer 750 that is carried by the substrate layer 720. The prismatic layer 750 is disposed on the major surface 720a of the substrate layer, which surface 720a coincides with a major surface 750b of the layer 750, the layer 750 also including another major surface 750a which coincides with major surface 719a of the film 719.

The optical film 719 includes two layers: substrate layer 720, which for purposes of this description is assumed to be birefringent, and prismatic layer 750. In general, the optical film 719 can have one or more layers. For example, in some cases, the optical film 719 can have only a single layer that includes respective first and second major surfaces 719a, 719b. As another example, in some cases, the optical film 719 can have many layers. For example, in some cases, the substrate 720 may be composed of multiple distinct layers. When the optical film includes multiple layers, the constituent layers are typically coextensive with each other, and each pair of adjacent constituent layers comprise tangible optical materials and have major surfaces that are completely coincident with each other, or that physically contact each other at least over 80%, or at least 90%, of their respective surface areas.

Prisms 751 may be designed to redirect light that is incident on major surface 719b of the optical film 719, along a desired direction, such as along the positive z-direction. In the exemplary optical film 719, prisms 751 are linear prismatic structures. In general, the prisms 751 can be any type of prisms or prism-like microstructures that are capable of redirecting light by, for example, refracting a portion of incident light and recycling a different portion of the incident light. For example, the cross-sectional profiles of prisms 751 can be or include curved and/or piece-wise linear portions.

Each of the prisms 751 includes an apex angle 752 and a height measured from a common reference plane such as, for example, major surface 750b. Individual prisms 751a, 751b, 751c, etc., are shown with heights 753a, 753b, 753c, . . . , 753e, and so forth. In some cases, e.g. when it is desirable to reduce optical coupling or wet-out and/or improve durability of the light redirecting optical film, the height of a given prism 751 can change along the y-direction. For example, the prism height of linear prism 751a varies along the y-direction. In such cases, prism 751a has a local height 753a that varies along the y-direction, the varying height defining a maximum height and an average height. In some cases, a prism, such as linear prism 751c, has a constant height along the y-direction. In such cases, the prism has a constant local height 753c that is equal to the prism's maximum height and average height.

In some cases, such as when it is desirable to reduce optical coupling or wet-out, some of the linear prisms are shorter and some are taller. For example, height 753c of linear prism 751c is smaller than height 753b of linear prism 751b.

The apex or dihedral angle 752 of each prism can have any value that may be desirable in an application. For example, in some cases, apex angle 752 can be in a range from about 70 degrees to about 110 degrees, or from about 80 degrees to about 100 degrees, or from about 85 degrees to about 95 degrees. In some cases, the prisms 751 have equal apex angles which can, for example, be in a range from about 88 or 89 degrees to about 92 or 91 degrees, such as 90 degrees.

Prismatic layer 750 can be composed of any suitable light-transmissive material and may have any suitable index of refraction. For example, in some cases, the prismatic layer may have an index of refraction in a range from about 1.4 to about 1.8, or from about 1.5 to about 1.8, or from about 1.5 to about 1.7. In some cases, the prismatic layer may have an index of refraction that is not less than about 1.5, or not less than about 1.55, or not less than about 1.6, or not less than about 1.65, or not less than about 1.7. The prismatic layer may be entirely or partially birefringent, and it may be entirely or partially (substantially) isotropic.

In most cases, such as when the optical film 719 is used in a liquid crystal display system, the optical film 719 increases the on-axis brightness of the display, i.e., the brightness as measured along the z-axis, when compared to the identical display without the optical film 719. For purposes of quantifying the improvement in axial luminance, the optical film 719 is said to have an "effective transmission", or relative "gain", that is greater than 1. As used herein, "effective transmission" ("ET") refers to the ratio of the on-axis luminance with the film in place to the on-axis luminance of the display system without the film in place, when the light source is a Lambertian or nearly Lambertian source with a diffuse reflectivity>80%.

The ET of the optical film can be measured using an optical system that includes a hollow Lambertian light box, a linear light absorbing polarizer, and a photodetector centered on an optical axis of the light box. The hollow light box may be illuminated by a stabilized broadband light source connected to an interior of the light box via an optical fiber, and the light emitted from an emitting or exit surface of the light box may have a Lambertian luminance distribution. The optical film or other test sample whose ET is to be measured is placed at a location between the light box and the absorbing linear polarizer. Dividing the photodetector output with the optical film present in the system by the photodetector output with the optical film absent from the system yields the ET for the optical film.

A suitable photodetector for use in measuring ET is a SpectraScan™ PR-650 SpectraColorimeter, available from Photo Research, Inc, Chatsworth, Calif. A suitable light box for such measurements is a Teflon cube having a total reflectance of about 85%.

The ET of the optical film 719 can be measured by placing the optical film 719 at the specified location with the major surface 719a (and the linear prisms 751) facing the photodetector and the major surface 719b facing the light box. Next, the spectrally weighted axial luminance I1 (the luminance along the optical axis) is measured through the linear absorbing polarizer by the photo detector. The optical film 719 is then removed and the spectrally weighted luminance I2 is measured without the optical film 719. ET is the ratio I1/I2. The ET may be specified in further detail by specifying the orientation of the optical film relative to the linear absorbing polarizer. For example, "ET0" refers to the effective transmission when the optical film is oriented such that each of the prisms 751 extends along a direction that is parallel to the pass axis of linear absorbing polarizer, and "ET90" refers to the effective transmission when the optical film is oriented such that each of the prisms 751 extends along a direction that is perpendicular to the pass axis of the linear absorbing polarizer. Further in this regard, the "average effective transmission" ("ETA") is the average of ET0 and ET90. In view of this additional terminology, the term "effective transmission" or "ET" referred to earlier, without more, refers to the average effective transmission of the optical film.

In exemplary cases, the disclosed microreplicated optical films, including optical film 719, are configured to increase system brightness, and the linear prisms have a refractive index of at least about 1.6, and the average effective transmission (ETA) of the optical film is at least about 1.3, or at least 1.5, or at least 1.7, or at least 1.9, or at least 2.1.

Light diffusion or scattering can be expressed in terms of a parameter called "optical haze" or simply "haze". For a film, surface, or other object that is illuminated by a normally incident light beam, the optical haze of the object refers to the ratio of transmitted light that deviates from the normal direction by more than 4 degrees to the total transmitted light. Haze can be calculated in a simulation, and for actual samples it can be measured using a Haze-Gard Plus haze meter (available from BYK-Gardner, Columbia, Md.) according to the procedure described in ASTM D1003, or with other suitable procedures. Related to optical haze is optical clarity, which refers to the ratio $(T_1-T_2)/(T_1+T_2)$, where $T_1$ is the transmitted light that deviates from the normal direction between 1.6 and 2 degrees from the normal direction, and $T_2$ is the transmitted light that lies between zero and 0.7 degrees from the normal direction. Clarity values may also be measured using the Haze-Gard Plus haze meter from BYK-Gardiner.

In some embodiments, no air gap is provided between the prismatic layer and the birefringent substrate, and the light scattering or haze is provided by an embedded structured surface rather than an exposed structured surface. The structured surface can then be said to be buried or embedded, because it is bounded on opposite sides by light-transmissive materials that are solid or otherwise tangible, for example, suitable light-transmissive polymer materials.

In some embodiments, structured surface is configured in such a way that a substantial majority of the surface, for example, at least 80% or at least 90% of the structured surface in plan view, does not exhibit focusing properties. One way this can be achieved is to configure the structured surface such that a substantial majority of the surface is made up of portions that curve in a same orientation, e.g., toward or away from the prisms of the prismatic layer. Each such curved portion of the structured surface can be referred to as a lenslet. In some embodiments, for example, portions of a structured surface may all curve generally away from the prism layer, and may be considered to be lenslets. In some configurations, the lenslets will be defocusing, i.e. they will each defocus incident collimated light due to a difference in refractive index between layers. In some embodiments, at least 80% of the structured surface is covered or occupied by the lenslets. A substantial minority of the structured surface which preferably cover or occupy less than 20% or less than 10% of the surface may be curved in such a way as to have focusing properties.

Numerous design variations can be employed in the disclosed optical films, including in particular the optical films that incorporate an embedded structured surface. In addition to the particular layer arrangements shown and described in connection with the drawings, the films may include additional layers and/or coatings to provide desired optical and/or mechanical functionality. Any of the described layers may be constructed using two or more distinct sub-layers. Similarly, any two or more adjacent layers may be combined into, or replaced with, a single unitary layer. Wide varieties of prism designs, film or layer thicknesses, and refractive indices may be used. The prismatic layer can have any suitable index of refraction, e.g., in a range from about 1.4 to about 1.8, or from about 1.5 to about 1.8, or from about 1.5 to about 1.7, or not less than about 1.5, or not less than about 1.55, or not less than about 1.6, or not less than about 1.65, or not less than about 1.7. The birefringent substrate may have a typical birefringence, including an in-plane birefringence, as discussed above. In some cases, dyes, pigments, and/or particles (including scattering particles or other suitable diffusing agents) can be included in one or more of the layers or components of the optical films for desired functionality. Although polymer materials are sometimes preferred for use in the disclosed optical films for functionality and economy, other suitable materials may also be used.

Nanovoided materials, including those having an ultra low index (ULI), e.g. a refractive index of less than 1.4, or less than 1.3, or less than 1.2, or in a range from 1.15 to 1.35, may also be used in the disclosed optical films. Many such ULI materials may be described as porous materials or layers. When used in combination with more common optical polymer materials that are not nanovoided, and that have substantially higher refractive indices such as greater than 1.5 or greater than 1.6, a relatively large refractive index difference Δn can be provided across the embedded structured surface. Suitable ULI materials are described e.g. in WO 2010/120864 (Hao et al.) and WO 2011/088161 (Wolk et al.), which are incorporated herein by reference.

We have developed a process that can be used to form structured surfaces that are well suited for making high performance optical diffusing films, including embedded structured surfaces used in conjunction with, for example, the configuration of FIG. 6. The process can produce a structured surface in a microreplication tool of considerable surface area, e.g., a surface area at least as large as that of a typical desktop computer display screen, in a period of time that is short compared to the time it would take to produce a structured surface of equal area and comparable feature size by cutting features in a substrate with a cutting tool. This is because the process can employ electroplating techniques rather than cutting techniques to produce the structured surface. (However, in some cases described further below, electroplating can be used in addition to cutting.) The process can be tailored to produce a wide variety of structured surfaces, including structured surfaces that provide very high haze (and low clarity), structured surfaces that provide very low haze (and high clarity), and structured surfaces in between these extremes. The process can utilize a first electroplating procedure in which a preliminary structured surface is produced, the preliminary structured surface corresponding substantially to that of a Type II Microreplicated diffusing film discussed above. Recall in connection with FIG. 6 that Type II Microreplicated diffusing films cover a general design space that has relatively high optical clarity. We have found that by covering the preliminary structured surface with a second electrodeposited layer using a second electroplating procedure, a second structured surface is obtained, and the second structured surface can produce diffusing films of high, low, or intermediate haze, depending on process conditions; however, diffusing films made from the second structured surface are different from those made from the preliminary structured surface. In particular, interestingly, diffusing films made from the second structured surface fall within a general design space having a substantially lower clarity (for intermediate values of haze) than the design space for Type II Microreplicated diffusing films. This will be shown in connection with optical diffusing films made in accordance with the developed process. At least some of the optical diffusing films are also shown to possess other desirable characteristics, including a topography characterized by little or no spatial periodicity, and average feature sizes less than 15 microns, or less than 10 microns.

Figure 8:
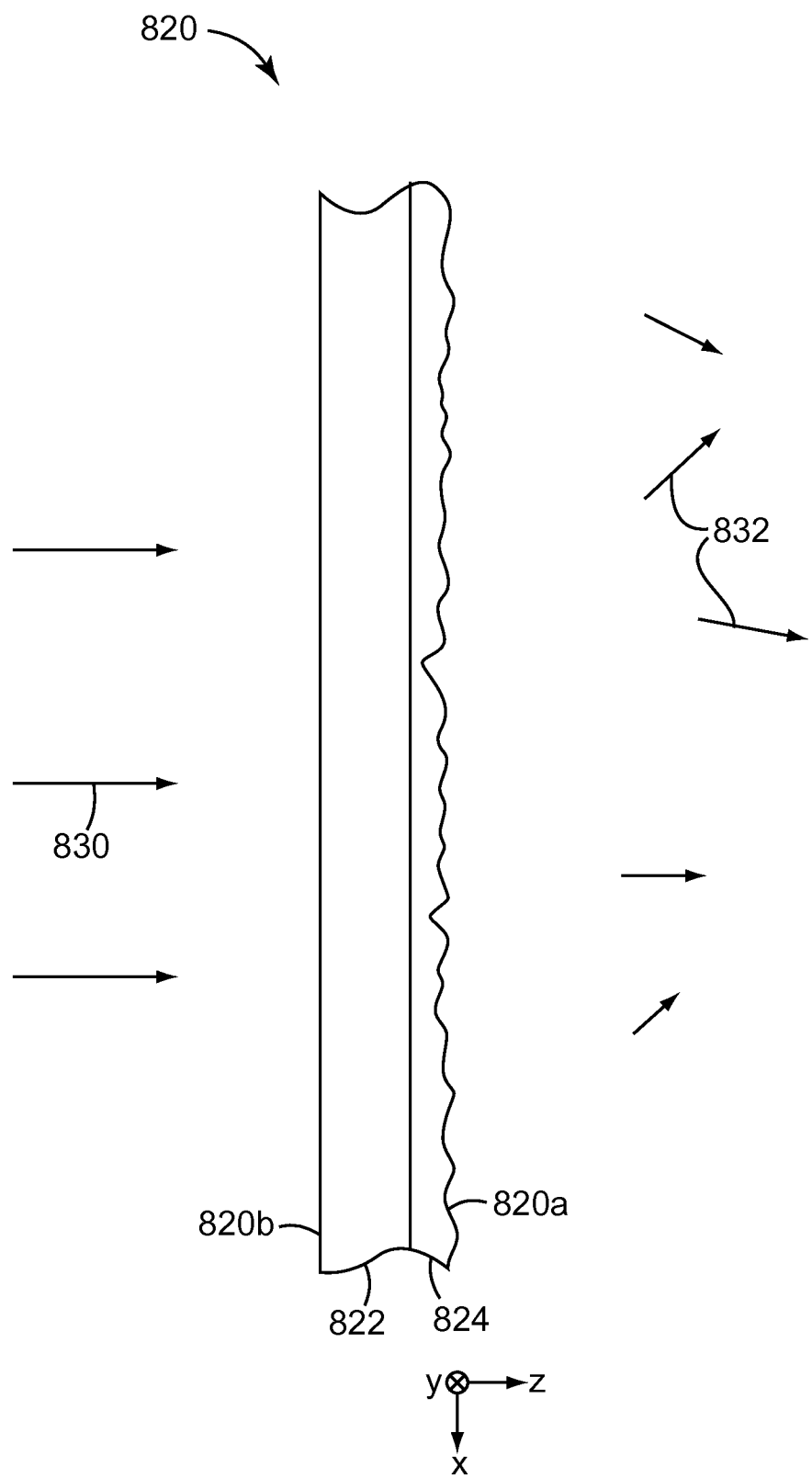
FIG. 8 is a schematic side or sectional view of an optical diffusing film having a structured surface.

FIG. 8 depicts in schematic side or sectional view a portion of a representative diffusing optical film 820 that can be made with the disclosed processes. The film 820 is shown to have a first major surface 820a and a second major surface 820b. Incident light 830 is shown impinging on the film 820 at the second surface 820b. The light 830 passes through the film, and is scattered or diffused as a result of refraction (and to some extent diffraction) at the roughened or structured topography of the major surface 820a, producing scattered or diffuse light 832. We may thus refer to the major surface 820a alternatively as a structured surface 820a. The orientation of the film 820 relative to the incident light 830 may of course be changed such that the light 830 impinges initially on the structured surface 820a, in which case refraction at the structured surface again produces scattered or diffuse light.

The structured surface 820a extends generally along orthogonal in-plane directions, which can be used to define a local Cartesian x-y-z coordinate system. The topography of the structured surface 820a can then be expressed in terms of deviations along a thickness direction (z-axis), relative to a reference plane (the x-y plane) lying parallel to the structured surface 820a. In many cases, the topography of the structured surface 820a is such that distinct individual structures can be identified. Such structures may be in the form of protrusions, which are made from corresponding cavities in the structured surface tool, or cavities, which are made from corresponding protrusions in the structured surface tool. The structures are typically limited in size along two orthogonal in-plane directions, i.e., when the structured surface 820a is seen in plan view, individual structures do not typically extend indefinitely in a linear fashion along any in-plane direction. Whether protrusions or cavities, the structures may also in some cases be closely packed, i.e., arranged such that at least portions of boundaries of many or most adjacent structures substantially meet or coincide. The structures are also typically irregularly or non-uniformly dispersed on the structured surface 820a. In some cases, some, most, or substantially all (e.g., >90%, or >95%, or >99%) of the structures may be curved or comprise a rounded or otherwise curved base surface. In some cases, at least some of the structures may be pyramidal in shape or otherwise defined by substantially flat facets. The size of a given structure may be expressed in terms of an equivalent circular diameter (ECD) in plan view, and the structures of a structured surface may have an average ECD of less than 15 microns, or less than 10 microns, or in a range from 4 to 10 microns, for example. The structured surface and structures can also be characterized with other parameters as discussed elsewhere herein, e.g., by an aspect ratio of the depth or height to a characteristic transverse dimension such as ECD, or the total length of ridges on the surface per unit area in plan view. The optical haze, optical clarity, and other characteristics of the optical diffusing films can be provided without the use of any beads at or on the structured surface, or elsewhere within the optical film.

Among the various parameters that can be used to characterize the optical behavior of a given optical diffusing film, two key parameters are optical haze and optical clarity. Light diffusion or scattering can be expressed in terms of "optical haze", or simply "haze". For a film, surface, or other object that is illuminated by a normally incident light beam, the optical haze of the object refers essentially to the ratio of transmitted light that deviates from the normal direction by more than 4 degrees to the total transmitted light as measured, for example, using a Haze-Gard Plus haze meter (available from BYK-Gardner, Columbia, Md.) according to the procedure described in ASTM D1003, or with a substantially similar instrument and procedure. Related to optical haze is optical clarity, which is also measured by the Haze-Gard Plus haze meter from BYK-Gardner, but where the instrument is fitted with a dual sensor having a circular middle sensor centered within an annular ring sensor, the optical clarity referring to the ratio $(T_1-T_2)/(T_1+T_2)$, where $T_1$ is the transmitted light sensed by the middle sensor and $T_2$ is the transmitted light sensed by the ring sensor, the middle sensor subtending angles from zero to 0.7 degrees relative to an axis normal to the sample and centered on the tested portion of the sample, and the ring sensor subtending angles from 1.6 to 2 degrees relative to such axis, and where the incident light beam, with no sample present, overfills the middle sensor but does not illuminate the ring sensor (underfills the ring sensor by a half angle of 0.2 degrees).

Figure 9:
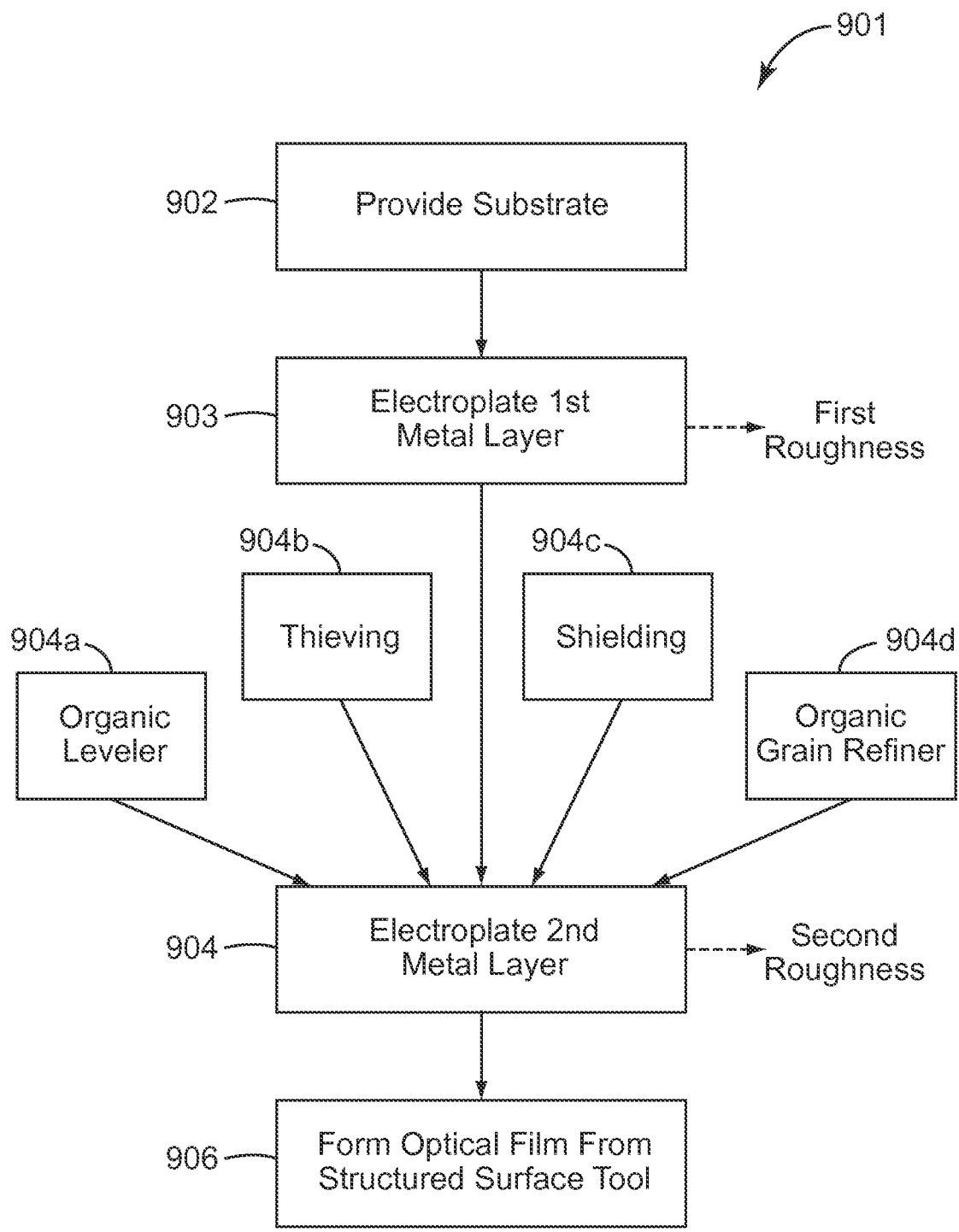
FIG. 9 is a schematic flow diagram depicting steps used to make structured surface articles, including structured surface tools and structured surface optical films.

FIG. 9 shows an exemplary version 901 of the process. In a step 902 of the process, a base or substrate is provided that can serve as a foundation upon which metal layers can be electroplated. The substrate can take one of numerous forms, e.g. a sheet, plate, or cylinder. Circular cylinders are advantageous in that they can be used to produce continuous roll goods. The substrate is typically made of a metal, and exemplary metals include nickel, copper, and brass. Other metals may however also be used. The substrate has an exposed surface ("base surface") on which electrodeposited layers will be formed in subsequent steps. The base surface may be smooth and flat, or substantially flat. The curved outer surface of a smooth polished cylinder may be considered to be substantially flat, particularly when considering a small local region in the vicinity of any given point on the surface of the cylinder. The base surface may be characterized by a base average roughness. In this regard, the surface "roughness" of the base surface, or the "roughness" of other surfaces mentioned herein, may be quantified using any generally accepted roughness measure, such as average roughness $R_a$ or root mean squared roughness $R_{rms}$, and the roughness is assumed to be measured over an area large enough to be fairly representative of the entire relevant area of the surface at issue.

In a step 903 of the process 901, a first layer of a metal is formed on the base surface of the substrate using a first electroplating process. Before this step is initiated, the base surface of the substrate may be primed or otherwise treated to promote adhesion. The metal may be substantially the same as the metal of which the base surface is composed. For example, if the base surface comprises copper, the first electroplated layer formed in step 903 may also be made of copper. To form the first layer of the metal, the first electroplating process uses a first electroplating solution. The composition of the first electroplating solution, e.g., the type of metal salt used in the solution, as well as other process parameters such as current density, plating time, and substrate speed, are selected so that the first electroplated layer is not formed smooth and flat, but instead has a first major surface that is structured, and characterized by irregular flat-faceted features. The size and density of the irregular features are determined by the current density, plating time, and substrate speed, while the type of metal salt used in the first electroplating solution determines the geometry of the features. Further teaching in this regard can be found in patent application publication US 2010/0302479 (Aronson et al.). The first plating process is carried out such that the first major surface of the first electroplated layer has a first average roughness that is greater than the base average roughness of the substrate. The structured character and roughness of a representative first major surface can be seen in the SEM image of FIG. 5, which shows the structured surface of a Type II Microreplicated diffusing film, the film being microreplicated from the first major surface of a first electroplated layer made in accordance with step 903.

After the first electroplated layer of the metal is made in step 903, with its structured major surface of first average roughness, a second electroplated layer of the metal is formed in step 904 using a second electroplating process. The second layer of the metal covers the first electroplated layer, and, since their compositions may be substantially the same, the two electroplated layers may no longer be distinguishable, and the first major surface of the first layer may become substantially obliterated and no longer detectable. Nevertheless, the second electroplating process differs from the first electroplating process in such a way that the exposed second major surface of the second electroplated layer, although structured and non-flat, has a second average roughness that is less than the first average roughness of the first major surface. The second electroplating process may differ from the first electroplating process in a number of respects in order to provide the second major surface with a reduced roughness relative to the first major surface.

In some cases, the second electroplating process of step 904 may use a second electroplating solution that differs from the first electroplating solution in step 903 at least by the addition of an organic leveler, as shown in box 904a. An organic leveler is a material that introduces into a plating bath an ability to produce deposits relatively thicker in small recesses and relatively thinner on small protrusions with an ultimate decrease in the depth or height of the small surface irregularities. With a leveler, a plated part will have greater surface smoothness than the basis metal. Exemplary organic levelers may include, but are not limited to, sulfonated, sulfurized hydrocarbyl compounds; allyl sulfonic acid; polyethylene glycols of various kinds; and thiocarbamates, including bithiocarbamates or thiourea and their derivatives. The first electroplating solution may contain, at most, trace amounts of an organic leveler. The first electroplating solution may have a total concentration of organic carbon less than 100, or 75, or 50 ppm. A ratio of a concentration of an organic leveler in the second electroplating solution to a concentration of any organic leveler in the first electroplating solution may be at least 50, or 100, or 200, or 500, for example. The average roughness of the second major surface can be tailored by adjusting the amount of organic leveler in the second electroplating solution.

The second electroplating process of step 904 may also or alternatively differ from the first electroplating process of step 903 by including in the second step 904 at least one electroplating technique or feature whose effect is to reduce the roughness of the second major surface relative to the first major surface. Thieving (box 904b) and shielding (box 904c) are examples of such electroplating techniques or features. Furthermore, in addition to or instead of an organic leveler, one or more organic grain refiners (box 904d) may be added to the second electroplating solution to reduce the average roughness of the second major surface.

After step 904 is completed, the substrate with the first and second electroplated layers may be used as an original tool with which to form optical diffusing films. In some cases the structured surface of the tool, i.e., the structured second major surface of the second electroplated layer produced in step 904, may be passivated or otherwise protected with a second metal or other suitable material. For example, if the first and second electroplated layers are composed of copper, the structured second major surface can be electroplated with a thin coating of chromium. The thin coating of chromium or other suitable material is preferably thin enough to substantially preserve the topography and the average roughness of the structured second major surface.

Rather than using the original tool itself in the fabrication of optical diffusing films, one or more replica tools may be made by microreplicating the structured second major surface of the original tool, and the replica tool(s) may then be used to fabricate the optical films. A first replica made from the original tool will have a first replica structured surface which corresponds to, but is an inverted form of, the structured second major surface. For example, protrusions in the structured second major surface correspond to cavities in the first replica structured surface. A second replica may be made from the first replica. The second replica will have a second replica structured surface which corresponds to, and is a non-inverted form of, the structured second major surface of the original tool too.

After step 904, after the structured surface tool is made, optical diffusing films having the same structured surface (whether inverted or non-inverted relative to the original tool) can be made in step 906 by microreplication from the original or replica tool. The optical diffusing film may be formed from the tool using any suitable process, including e.g. embossing a pre-formed film, or cast-and-curing a curable layer on a carrier film.

Figure 10:
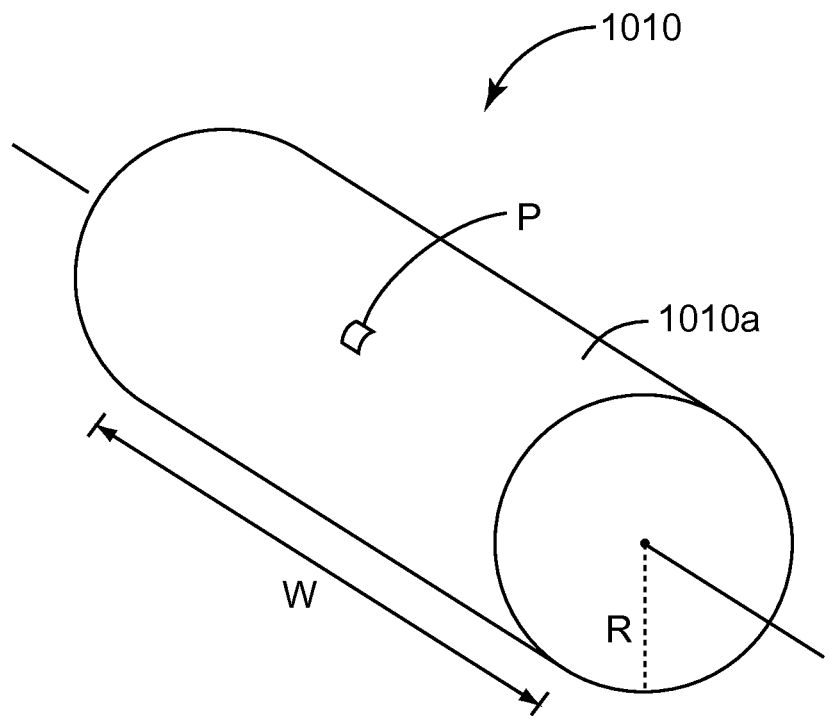
FIG. 10 is a schematic perspective view of a structured surface tool in the form of a cylinder or drum.

Turning now to FIG. 10, pictured there is a schematic view of a structured surface tool 1010 in the form of a cylinder or drum. The tool 1010 has a continuous major surface 1010a that we assume has been processed in accordance with the method of FIG. 9 so that it has an appropriately structured surface. The tool has a width w and a radius R. The tool can be used in a continuous film manufacturing line to make optical diffusing film by microreplication. A small portion P of the tool 1010, or of an identical tool, is shown schematically in FIG. 11A.

Figure 11A:
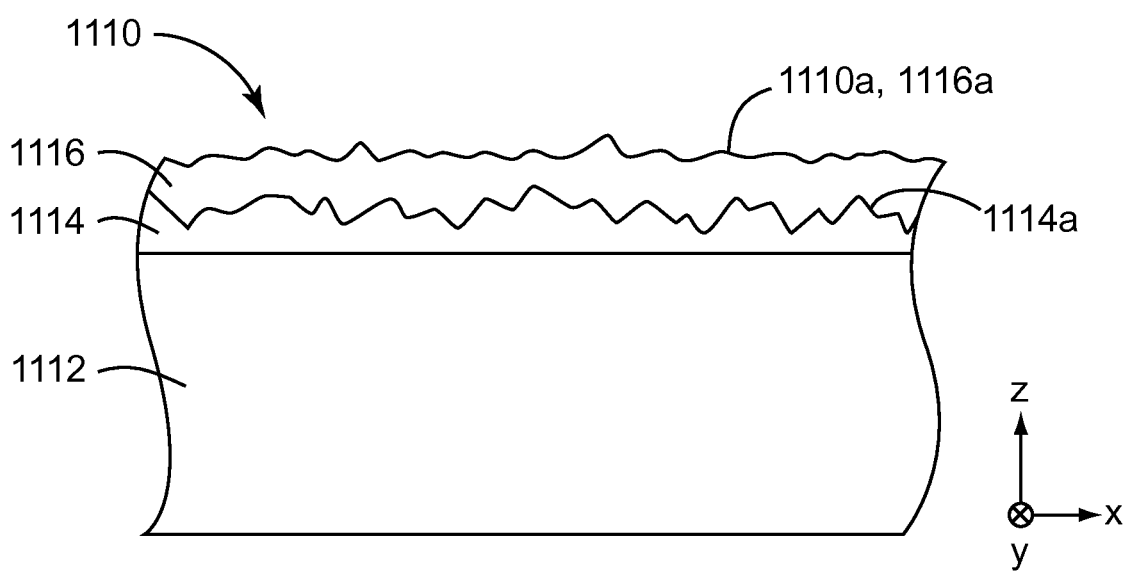
FIG. 11A is a schematic side or sectional view of a portion of the tool of FIG. 10.

In FIG. 11A, a structured surface tool 1110, assumed to be identical to tool 1010, is shown in schematic cross-section. Having been made by the process of FIG. 9, the tool 1110 is shown in the figure as including a substrate 1112, a first electroplated layer 1114 of a metal having a structured first major surface 1114a, and a second electroplated layer 1116 of the metal, the second layer 1116 having a structured second major surface 1116a which coincides with the structured major surface 1110a of the tool 1110. In accordance with the teachings of FIG. 9, the second major surface 1116a is structured or non-smooth, and it has an average roughness less than that of the first major surface 1114a. The first major surface 1114a, and the distinct layers 1114, 1116, are shown for reference purposes in FIG. 11a, however, as noted above, the formation of the second electroplated layer 1116 atop the first electroplated layer 1114 may render the first major surface 1114a, and the distinction between layers 1114 and 1116, undetectable.

Figure 11B:
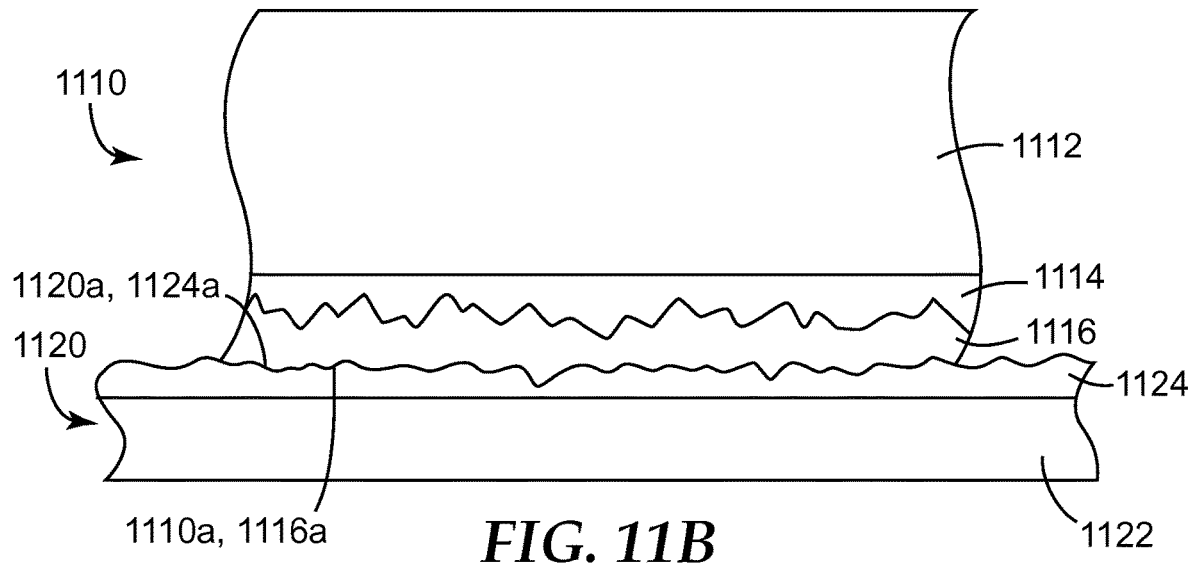
FIG. 11B is a schematic side or sectional view of the tool portion of FIG. 11A during a microreplication procedure in which it is used to make the structured surface of an optical diffusing film.

In FIG. 11B, we show a schematic view of the tool 1110 of FIG. 11A during a microreplication procedure in which it is used to make the structured surface of an optical diffusing film 1120. Like reference numerals from FIG. 11A designate like elements, and need not be discussed further. During microreplication, the film 1120 is pressed against the tool 1110 so that the structured surface of the tool is transferred (in inverted form) with high fidelity to the film. In this case, the film is shown to have a base film or carrier film 1122 and a patterned layer 1124, but other film constructions can also be used. The patterned layer may be for example a curable material, or a thermoplastic material suitable for embossing. The microreplication process causes the major surface 1120a of the optical film 1120, which coincides with the major surface 1124a of the patterned layer 1124, to be structured or roughened in corresponding fashion to the structured major surface 1110a of the tool.

Figure 11C:
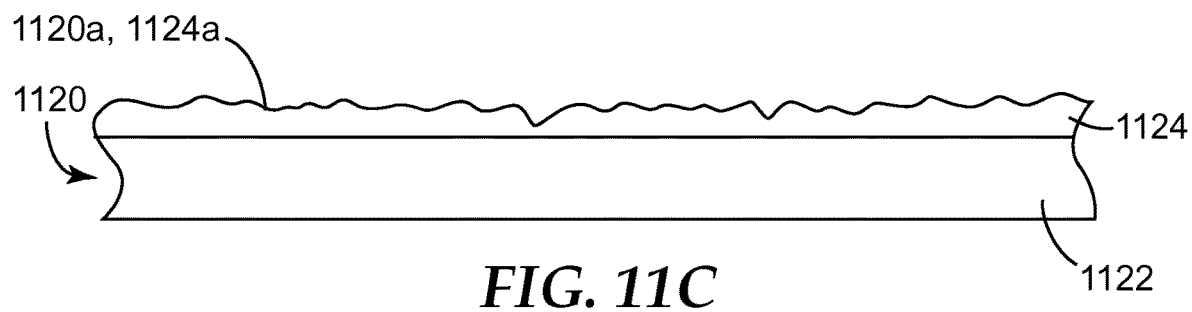
FIG. 11C is a schematic side or sectional view of a portion of the optical diffusing film made which results from the microreplication procedure depicted in FIG. 11B.
Figure 12:
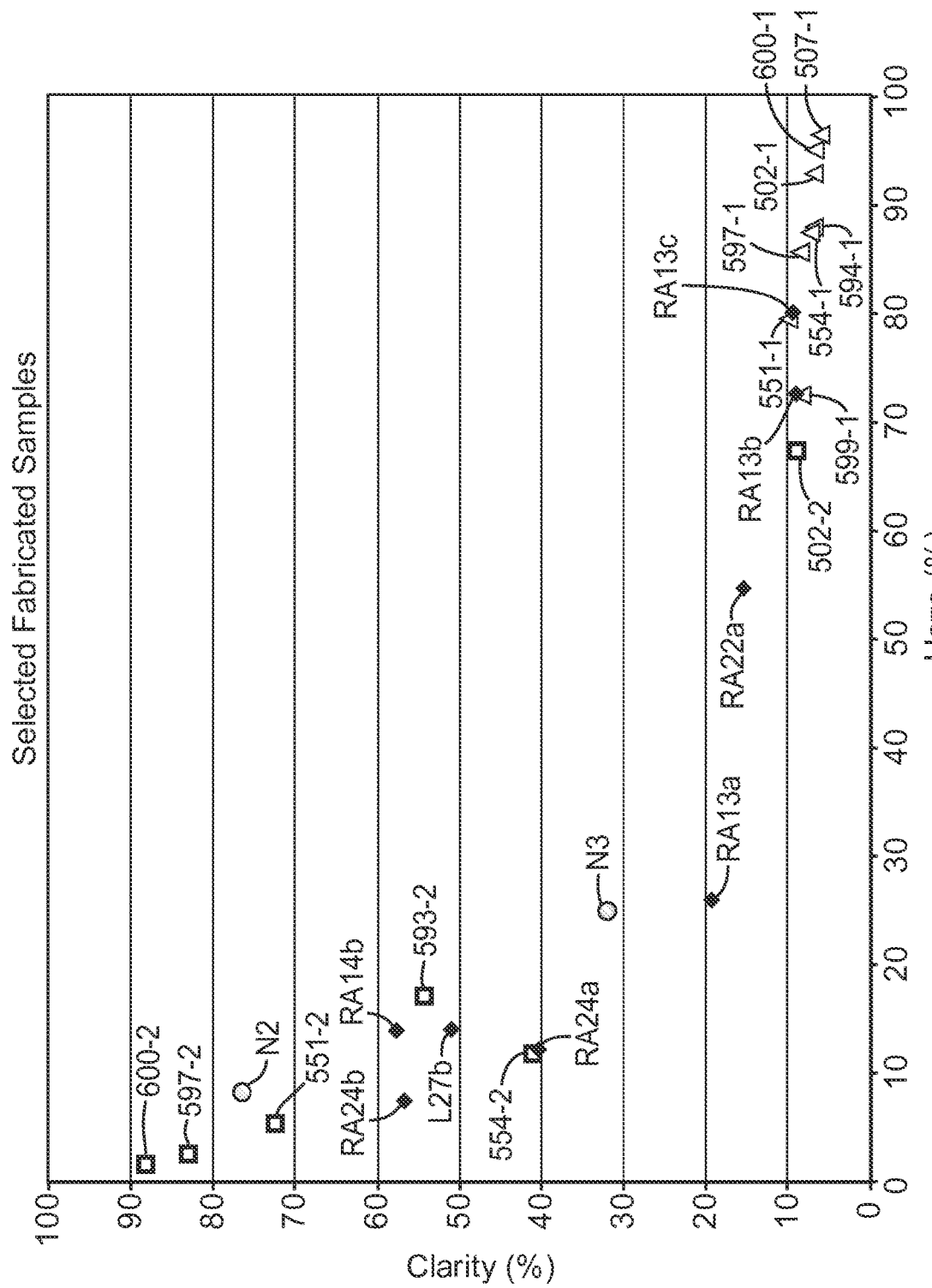
FIG. 12 is a graph of optical clarity vs. optical haze, each point on the graph depicting a different optical diffusing film sample made using a process in accordance with FIG. 9.

In FIG. 11C, the optical film 1120 made in the microreplication procedure of FIG. 11B is shown separated from the tool 1110. The film 1120, which may be the same as or similar to optical diffusing film 720 of FIG. 7, may now be used as an optical diffusing film.

Examples

A number of optical diffusing film samples were made according to methods as shown in FIG. 9. Thus, in each case, a structured surface tool was made under a set of process conditions, and then the structured surface of the tool was microreplicated to form a corresponding structured surface (in inverted form) as a major surface of the optical film. (The opposed major surface of each optical film was flat and smooth.) The structured surface provided each optical film with a given amount of optical haze and optical clarity. The haze and clarity of each optical diffusing film sample was measured with the Haze-Gard Plus haze meter from BYK-Gardiner. The following table sets forth some of the chemical solutions that were used during the fabrication of various samples, as explained further below:

TABLE 1

Some Solutions Used

| Element | Component | Supplier | Quantity |
| --- | --- | --- | --- |
| Alkaline cleaner | 25% Sodium hydroxide (NaOH) | Hawkins Chemical (Minneapolis, MN) | 30% v/v |
|  | 16% Sodium carbonate | Hawkins Chemical | 3.5% v/v |
|  | Triton X-114 | Dow Chemical Company (Midland, MI) | 0.9% v/v |
|  | Mayoquest L-50 | Vulcan Performance Chemicals (Birmingham, AL) | 0.9% v/v |
|  | Dowfax C6L | Dow Chemical Company | 1.4% v/v |
|  | Deionized (DI) water (15-18 megaohm) |  | Balance |

TABLE 1-continued

Some Solutions Used

| Element | Component | Supplier | Quantity |
| --- | --- | --- | --- |
| Citric acid solution | Citric acid 15% solution | Hawkins Chemical | 33% v/v |
| | DI water | | Balance |
| Sulfuric acid solution | Sulfuric acid 96% reagent grade | Mallinckrodt Baker (Phillipsburg, NJ) | 1% v/v |
| | DI water | | Balance |
| First copper bath | Liquid copper sulfate (68.7 g/L copper) | Univertical (Angola, IN) | 53.5 g/L as copper |
| | Sulfuric acid 96% reagent grade | Mallinckrodt Baker | 60 g/L as $H_2SO_4$ |
| | Hydrochloric acid 37% reagent | Mallinckrodt Baker | 60 mg/L as $Cl^-$ |
| | DI water | | Balance |
| Second copper bath | Liquid copper sulfate (68.7 g/L copper) | Univertical | 53.5 g/L as copper |
| | Sulfuric acid 96% reagent grade | Mallinckrodt Baker | 60 g/L as $H_2SO_4$ |
| | Hydrochloric acid 37% reagent | Mallinckrodt Baker | 60 mg/L as $Cl^-$ |
| | Grain refiner Cuflex 321 | Atotech USA (Rock Hill, SC) | 1.4% v/v |
| | DI water | | Balance |
| Chrome bath | Liquid chromic acid (440 g/L $CrO_3$) | Atotech USA | 250 g/L as $CrO_3$ |
| | Sulfuric acid 96% reagent grade | Mallinckrodt Baker | 2.5 g/L |
| | Trivalent chromium | | 0-20 g/L byproduct |
| | DI water | | Balance |

Preliminary Tool

A copper-coated cylinder, having a diameter of 16 inches and a length of 40 inches, was used as a base for the construction of a tool. The tool, which is referred to here as a preliminary tool because it was made using only one of the electroplating steps shown in FIG. 9, was first degreased with a mild alkaline cleaning solution, deoxidized with a sulfuric acid solution, and then rinsed with deionized water. The composition of the alkaline cleaner, as well as the compositions of other relevant solutions, are shown in Table 1. The preliminary tool was then transferred while wet to a copper plating tank (Daetwyler Cu Master Junior 18). It was rinsed with approximately 1 liter of the sulfuric acid solution at the start of the plating cycle to remove surface oxide. The preliminary tool was then immersed at a 50% level in the first copper bath. The bath temperature was 25° C. The copper bath was treated with carbon-filled canisters to remove organic contamination. Effectiveness of the treatment was verified both by using a 1000 mL brass Hull Cell panel that is plated at 5 amps for 5 minutes and evaluated for lack of brightness, and by TOC (total organic carbon) analysis using a persulfate TOC analyzer. TOC levels were determined to be below 45 parts per million (ppm). The preliminary tool was DC-plated at a current density of 60 amps per square foot (with a ramp up time at the start of 5 seconds) for 45 minutes while being rotated at 20 rpm. The distance from the anode to the nearest point on the tool during plating was approximately 45 mm. When plating was completed, the thickness of the plated copper, which we refer to as a first copper layer, was approximately 30 microns. The first copper layer had an exposed structured surface that was roughened with a multitude of flat facets.

Rather than covering the first copper layer with an electroplated second copper layer of lesser average roughness (in accordance with FIG. 9), for reference purposes, this preliminary tool, and in particular the structured surface of the first copper layer, was used to make a Type II Microreplicated diffusing film. This involved cleaning the preliminary tool and electroplating a chromium coating on the structured surface of the first copper layer. The chromium coating was thin enough to substantially preserve the topography of the first copper layer structured surface.

Accordingly, the preliminary tool, with the structured surface of the first copper layer still exposed, was washed with deionized water and a weak acid solution to prevent oxidation of the copper surface. Next, the preliminary tool was moved to a Class 100 clean room, placed in a cleaning tank, and rotated at 20 rpm. The preliminary tool was deoxidized using a citric acid solution, and then washed with an alkaline cleaner. After that it was rinsed with deionized water, deoxidized again with the citric acid solution, and rinsed with deionized water.

The preliminary tool was transferred to a chrome plating tank while wet and 50% immersed in the tank. The bath temperature was 124° F. The tool was DC-plated with chromium using a current density of 25 amps per square decimeter while the preliminary tool moved at a surface speed of 90 meters/minute. The plating continued for 400 seconds. Upon completion of plating, the preliminary tool was rinsed with deionized water to remove any remaining chrome bath solution. The chromium coating serves to protect the copper to prevent oxidation, and, as mentioned, it was thin enough to substantially preserve the topography of the first copper layer structured surface.

The preliminary tool was transferred to a cleaning tank where it was rotated at 10 rpm, washed with 1 liter of deionized water at ambient temperature, then washed with 1.5 liters of denatured alcohol (SDA-3A, reagent grade at ambient temperature) applied slowly to cover the entire tool surface. The tool rotation speed was then increased to 20 rpm. It was then air dried.

Type II Microreplicated Optical Diffusing Film

Figure 5:
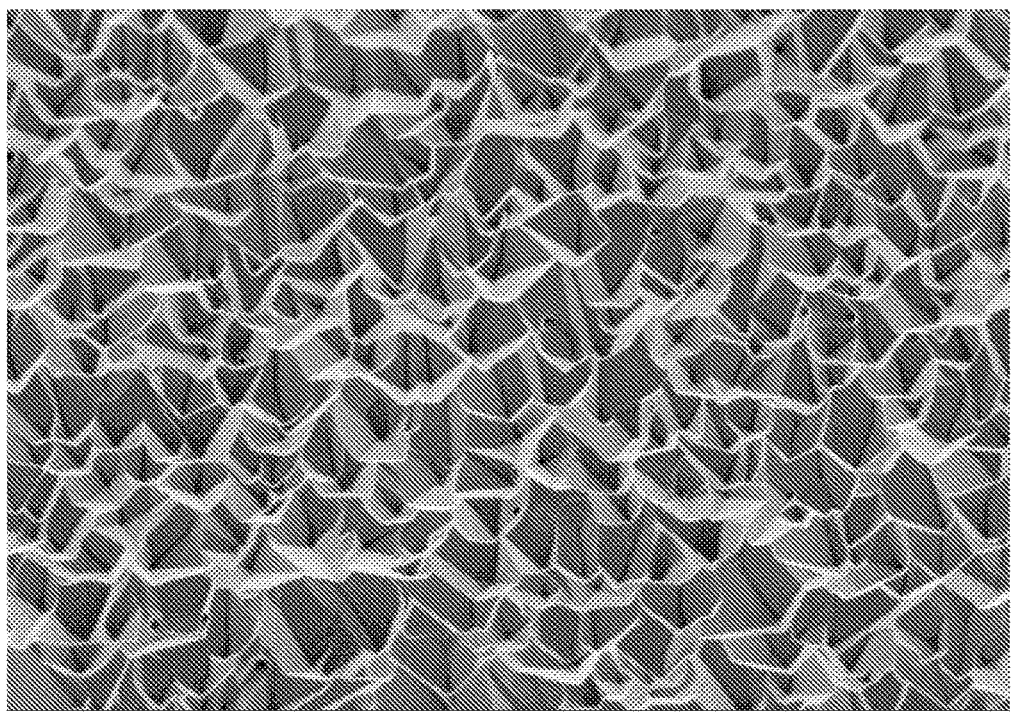
FIG. 5 is an SEM image of a portion of the structured surface of a Type II Microreplicated diffusing film (optical haze=100%, optical clarity=1.3%).

Once the preliminary tool was dried, a hand-spread film was made from the tool using a UV-curable acrylate resin coated on a primed PET film. This procedure microreplicated the structured surface of the first copper layer to produce a corresponding structured surface (but inverted relative to that of the preliminary tool) on the cured resin layer of the film. Due to its method of construction, the film was a Type II Microreplicated optical diffusing film. A scanning electron microscope (SEM) image of the film's structured surface is shown in FIG. 5. The optical haze and clarity of the film were measured with a Haze-Gard Plus system from BYK Gardner (Columbia Md.), and found to be 100%, and 1.3%, respectively.

First Tool

Another structured surface tool, referred to here as the first tool, was then made. Unlike the preliminary tool, the first tool was made using both electroplating steps shown in FIG. 9, so that the first copper layer was covered with an electroplated second copper layer of lesser average roughness.

The first tool was prepared in the same way as the preliminary tool, up to the chromium plating step. Then this first tool, with its first copper layer whose structured surface was of relatively high average roughness (substantially an inverted version of FIG. 5), was transferred before drying to a copper plating tank set up for additional plating. The first tool was rinsed with approximately one liter of the sulfuric acid solution, before the start of a second plating cycle, to remove surface oxide generated during the loading of the tool into the tank. The first tool was then 50% immersed in the second copper bath in a Daetwyler Cu Master Junior 18 tank. The bath temperature was 25° C. The second copper bath was carbon treated to remove organic contamination, as described above for the preliminary tool. After the carbon treatment, the second copper bath was recharged with an organic grain refiner (Cutflex 321 at a concentration of 14 milliliters/liter), such that the second copper bath had the composition shown above in Table 1. The composition of the second copper bath differed from that of the first copper bath by the addition of the organic grain refiner. The anode was positioned at a distance of approximately 45 mm from the first tool. The first tool was then DC plated for 12 minutes in the second copper bath using a current density of 60 amps per square foot while being rotated at 20 rpm. The current ramp time was about 5 seconds. This produced a second electroplated copper layer which covered the first copper layer, the second copper layer having a structured surface of lesser average roughness than that of the first copper layer. The thickness of the second copper layer was 8 microns.

The first tool was then transferred to a cleaning tank. It was rotated at 10-12 revolutions per minute while being washed with approximately 1 liter of deionized water at ambient temperature using a hose with a spray nozzle. A second wash was done using 1 to 2 liters of the citric acid solution at ambient temperature. Then the first tool was washed with approximately 3 liters of deionized water to remove excess citric acid using a hose with a spray nozzle. Next the first tool was rinsed with approximately 2 liters of denatured ethanol (SDA 3A of reagent grade) applied slowly at ambient temperature to cover the entire tool surface in order to aid in drying. The first tool was then air dried. Next, the first tool was moved to a Class 100 clean room, cleaned, and chrome plated, in the same way as was done with the preliminary tool. The chromium plating substantially retained the topography of the structured surface of the second copper layer.

Sample 502-1

Figure 14:
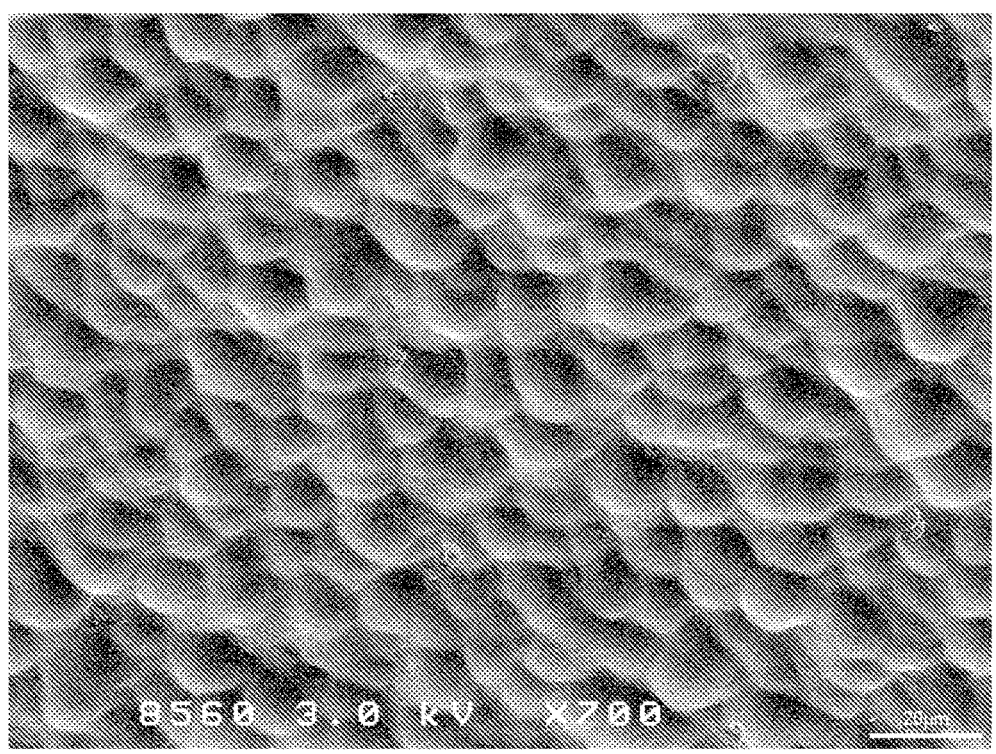
FIG. 14 is an SEM image of a representative portion of the structured surface of an optical diffusing film sample referred to as "594-1"

After air drying, the first tool was used to make a film via a hand spread. This too was done in the same way as was done with the preliminary tool, and it produced an optical diffusing film (referred to herein with the sample designation number 502-1) having a microreplicated structured surface on the cured resin layer of the film corresponding to (but inverted relative to) the structured surface of the second copper layer. An SEM image of the film's structured surface is shown in FIG. 14. Although the surface is structured, one can see that the average roughness of the surface is less than that of the structured surface of FIG. 5. An SEM image of a cross-section of the 502-1 sample is shown in FIG. 14a. The optical haze and clarity of this optical diffusing film sample 502-1 were measured with the Haze-Gard Plus system from BYK Gardner (Columbia Md.), and found to be 92.8%, and 6.9%, respectively. These values are listed in Table 2 below.

Second Tool

Another structured surface tool, referred to here as the second tool, was made. The second tool was made in substantially the same way as the first tool, except that the composition of the second copper bath was different: two organic grain refiners were used (Cutflex 321 at a concentration of 14 milliliters/liter, and Cutflex 320H at a concentration of 70 milliliters/liter), rather than just one. The second copper plating step was, however, again completed in 12 minutes, which produced a second electroplated copper layer whose thickness was 8 microns. After chrome plating the structured surface of the second copper layer, the second tool was ready to be used for microreplication to an optical film.

Sample 594-1

Figure 15:
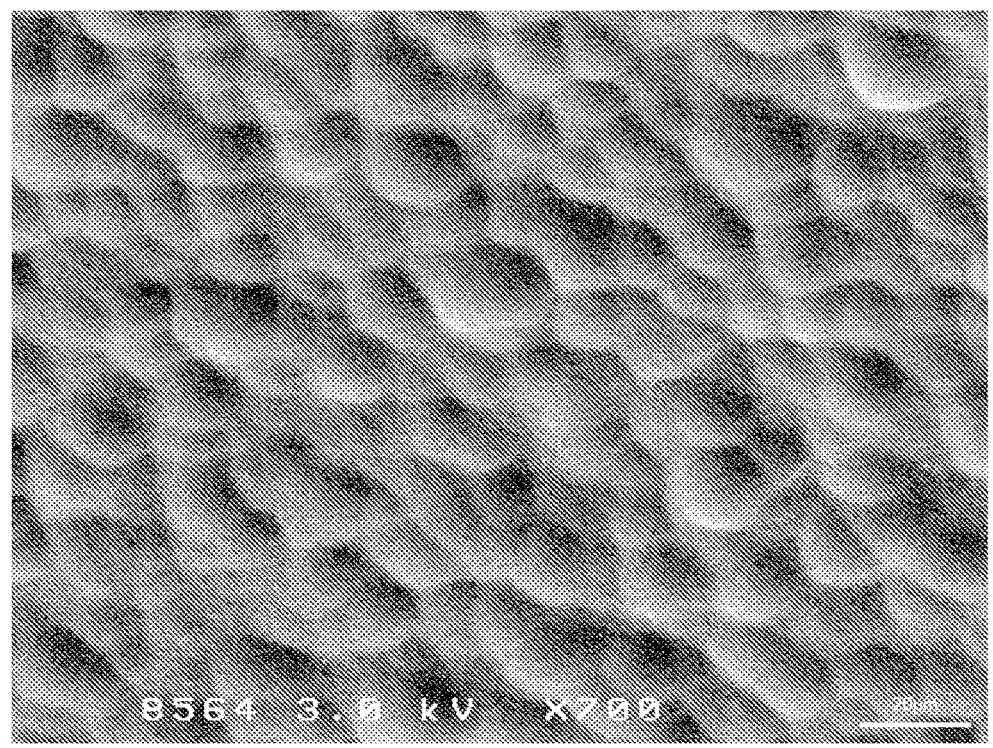
FIG. 15 is an SEM image of a representative portion of the structured surface of an optical diffusing film sample referred to as "599-1"

The second tool was then used to make a film via a hand spread. This was done in the same way as was done with the first tool, and it produced an optical diffusing film (referred to herein with the sample designation number 594-1) having a microreplicated structured surface on the cured resin layer of the film corresponding to (but inverted relative to) the structured surface of the second copper layer. An SEM image of the film's structured surface is shown in FIG. 15. Although the surface is structured, one can see that the average roughness of the surface is less than that of the structured surface of FIG. 5. The optical haze and clarity of this optical diffusing film sample 594-1 were measured with the Haze-Gard Plus system from BYK Gardner (Columbia Md.), and found to be 87.9%, and 6.9%, respectively. These values are listed in Table 2 below.

Third Tool

Another structured surface tool, referred to here as the third tool, was made. The third tool was made in substantially the same way as the second tool, except that the second copper plating was completed in 18 minutes rather than 12 minutes, which produced a second electroplated copper layer whose thickness was about 12 microns. After chrome plating the structured surface of the second copper layer, the third tool was ready to be used for microreplication to an optical film.

Sample 593-2

Figure 21:
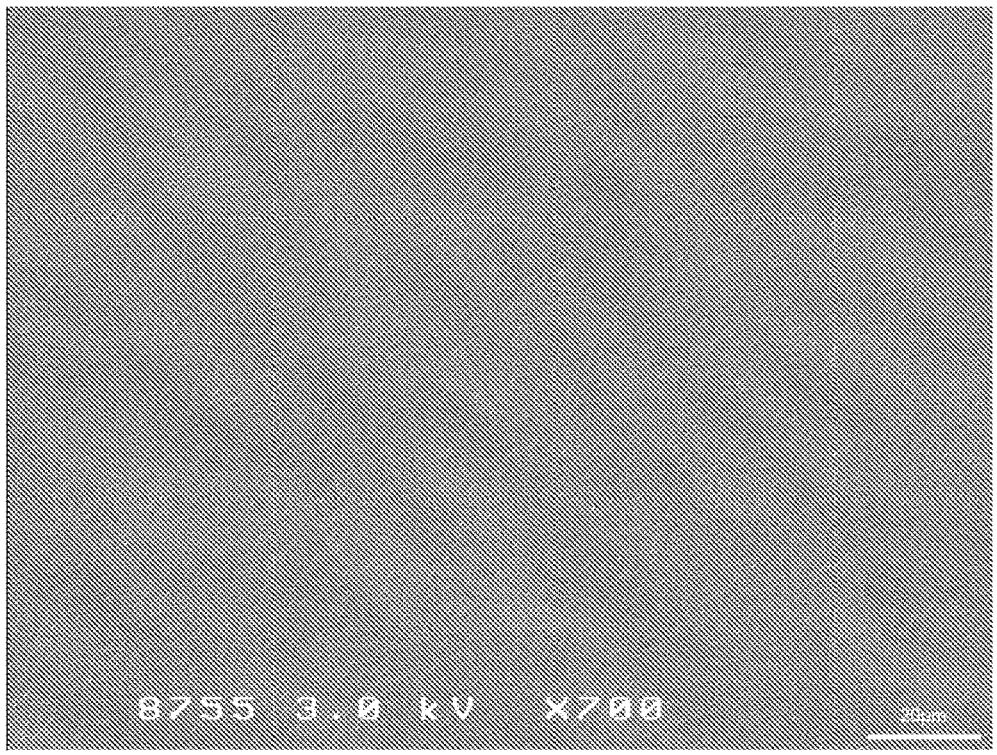
FIG. 21 is an SEM image of a representative portion of the structured surface of an optical diffusing film sample referred to as "597-2"

The third tool was then used to make a film via a hand spread. This was done in the same way as was done with the first and second tools, and it produced an optical diffusing film (referred to herein with the sample designation number 593-2) having a microreplicated structured surface on the cured resin layer of the film corresponding to (but inverted relative to) the structured surface of the second copper layer. An SEM image of the film's structured surface is shown in FIG. 21. Although the surface is structured, one can see that the average roughness of the surface is less than that of the structured surface of FIG. 5. The optical haze and clarity of this optical diffusing film sample 593-2 were measured with the Haze-Gard Plus system from BYK Gardner (Columbia Md.), and found to be 17.1%, and 54.4%, respectively. These values are listed in Table 2 below.

Fourth Tool

Another structured surface tool, referred to here as the fourth tool, was made. In order to make this fourth tool, two plating solutions were prepared. A first plating solution consisted of 60 g/L of sulfuric acid (J. T. Baker Chemical Company, Philipsburg, N.J.) and 217.5 g/L of copper sulfate (Univertical Chemical Company, Angola, Ind.). A second plating solution consisted of the contents of the first plating solution plus additives CUPRACID HT leveler (0.05% by volume), CUPRACID HT fine grainer (0.1% by volume), and CUPRACID HT wetting agent (0.3% by volume), all available from Atotech USA. Both solutions were made with deionized water. An 8 inch by 8 inch copper sheet was placed in a tank holding the first plating solution. The tank size was 36 inches (length)×24 inches (width)×36 inches (depth). The sheet was plated at 21° C. for 24 hours using a current density of 10 amps per square foot with a flow rate of 8 gallons per minute created using a circulation pump. This first plating step produced a first electrodeposited copper layer having a relatively rough structured surface, the thickness of the electrodeposited layer being about 330 microns. The plate was removed from the first plating solution, rinsed, and dried. The copper sheet with the first electroplated layer was then cut into a 1.5 inch×8 inch section. The backside of the section was shielded with adhesive tape and placed in a four-liter beaker containing the second plating solution, and plated at 25° C. for 35 minutes at a current density of 35 amps per square foot. This second plating step produced a second electrodeposited copper layer which covered the first copper layer, and the second copper layer had a structured surface whose average roughness was less than that of the first copper layer. The thickness of the second copper layer was about 28 microns. After the second plating step, the section, which is referred to as the fourth tool, was rinsed and dried. Unlike the first, second, and third tools, the second copper layer of the fourth tool was not plated with chromium. Instead, the exposed structured surface of the second copper layer was used directly for microreplication of an optical film.

It was discovered that, in contrast to the tools used to make the other optical diffusing film samples disclosed herein, the copper sheet used as a starting material to make the fourth tool deviated significantly from flatness, in particular, it contained substantially linear periodic undulations. These undulations were carried over into the structured surfaces of the first and second copper layers, such that the structured surface of the second copper layer contained not only roughness attributable to the electroplating steps, but also an undulation originating from the base copper sheet upon which the electrodeposited copper layers were formed.

Sample RA13a

Figure 19:
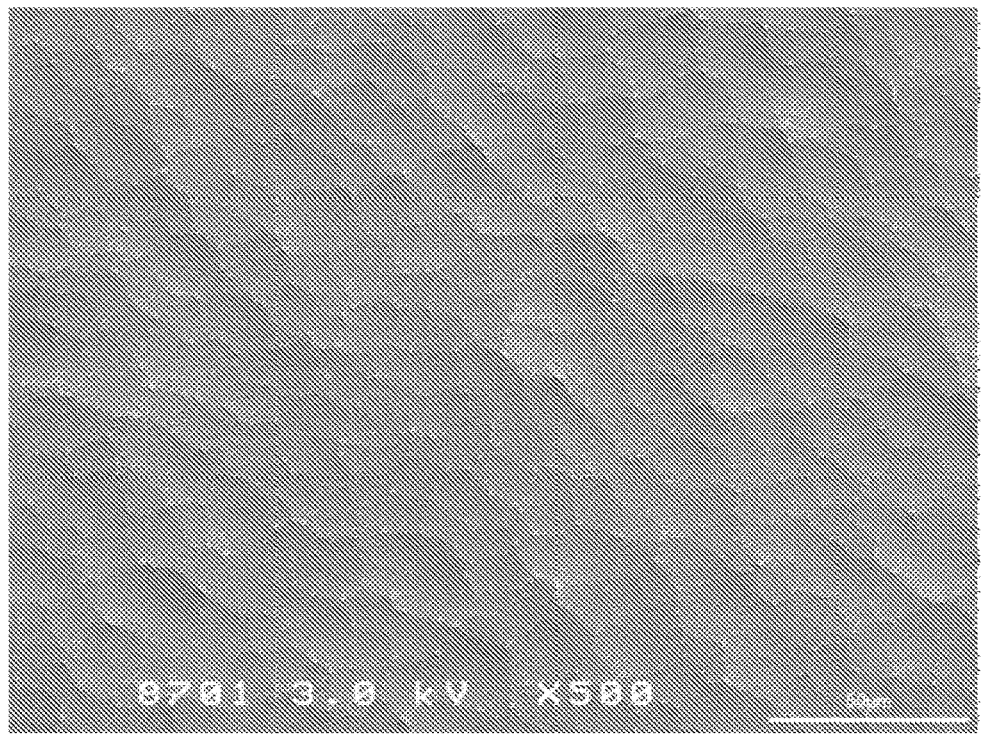
FIG. 19 is an SEM image of a representative portion of the structured surface of an optical diffusing film sample referred to as "N3"

The fourth tool was then used to make a film via a hand spread. This was done by applying a polyester film substrate with a uv-curable acrylate resin to the fourth tool. The resin was cured using a uv-processor from RPC Industries (Plainfield, Ill.) with a line speed of 50 feet per minute. The film was then removed from the structured surface of the fourth tool. The film was an optical diffusing film (referred to herein with the sample designation number RA13a) having a microreplicated structured surface on the cured resin layer of the film corresponding to (but inverted relative to) the structured surface of the second copper layer. An SEM image of the film's structured surface is shown in FIG. 19.

The faint periodic vertical lines seen in the figure are a result of the periodic undulations in the copper sheet starting material, and were not introduced by the two copper electroplating steps. The optical haze and clarity of this optical diffusing film sample RA13a were measured as with the other samples, and found to be 25.9%, and 19.4%, respectively. These values are listed in Table 2 below.

Samples 507-1, 600-1, 554-1, 597-1, 551-1, and 599-1

Figure 16:
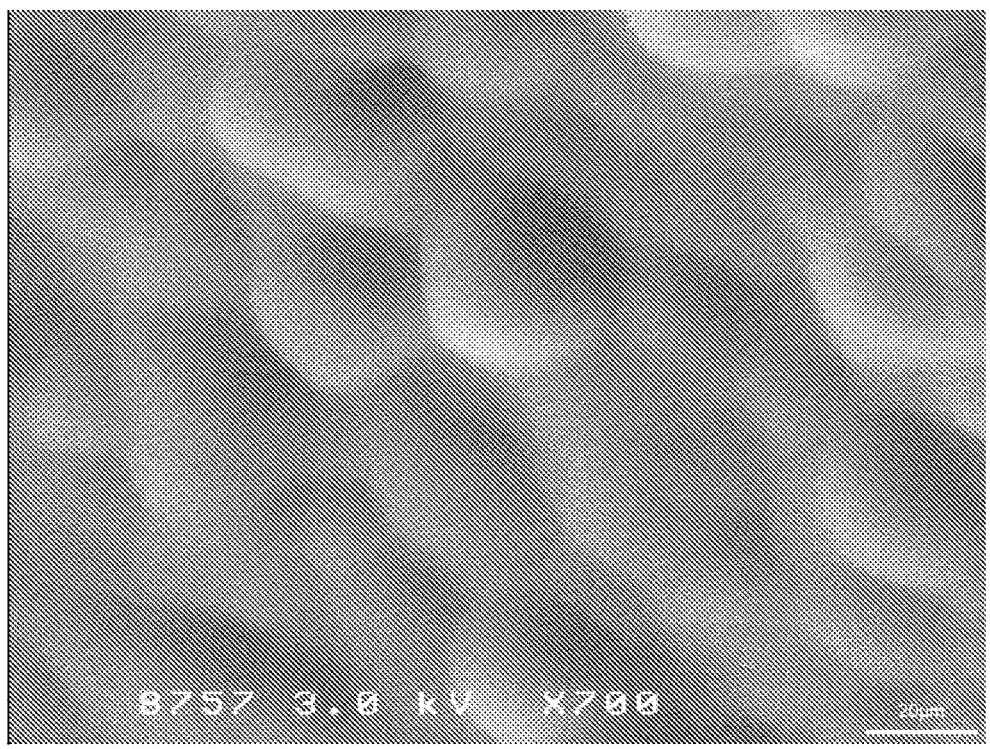
FIG. 16 is an SEM image of a representative portion of the structured surface of an optical diffusing film sample referred to as "502-2"

The tools used to make these optical diffusing film samples were made in the same manner as the tools for samples 502-1 and 594-1 above, except that one or more of the following were varied for the second electroplating step: the amount of organic leveler used, the current density, and the plating time. The samples themselves were then made from their respective tools via a hand spread in the same manner as samples 502-1 and 594-1, and the haze and clarity were measured as with the other samples. The measured values are listed in Table 2 below. An SEM image of the structured surface of film sample 599-1 is shown in FIG. 16.

Samples 502-2, 554-2, 551-2, 597-2, and 600-2

Figure 17:
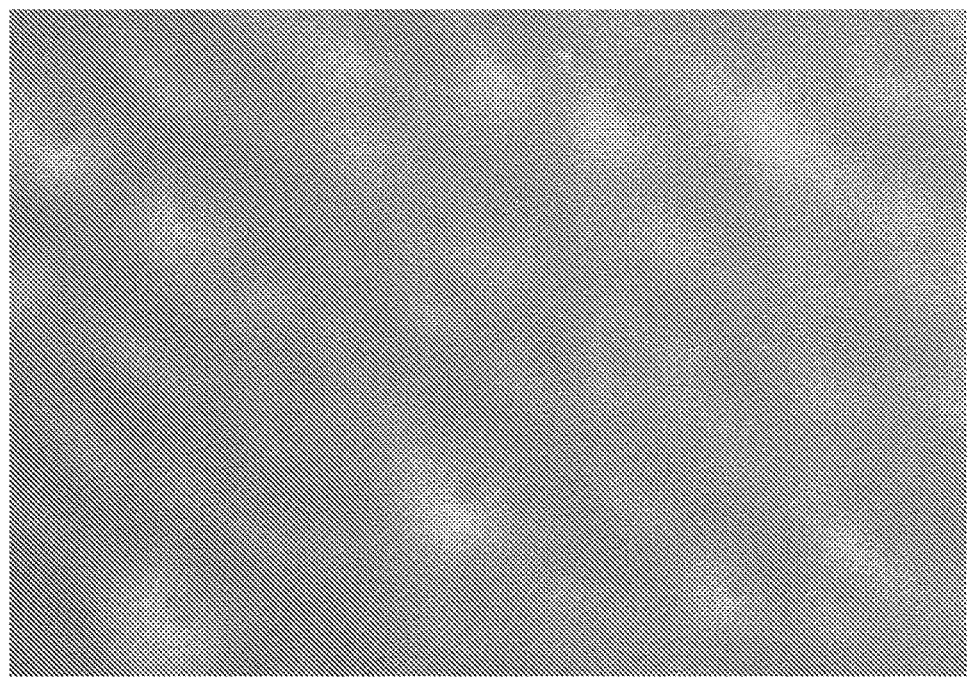
FIG. 17 is an SEM image of a representative portion of the structured surface of an optical diffusing film sample referred to as "RA22a"
Figure 22:
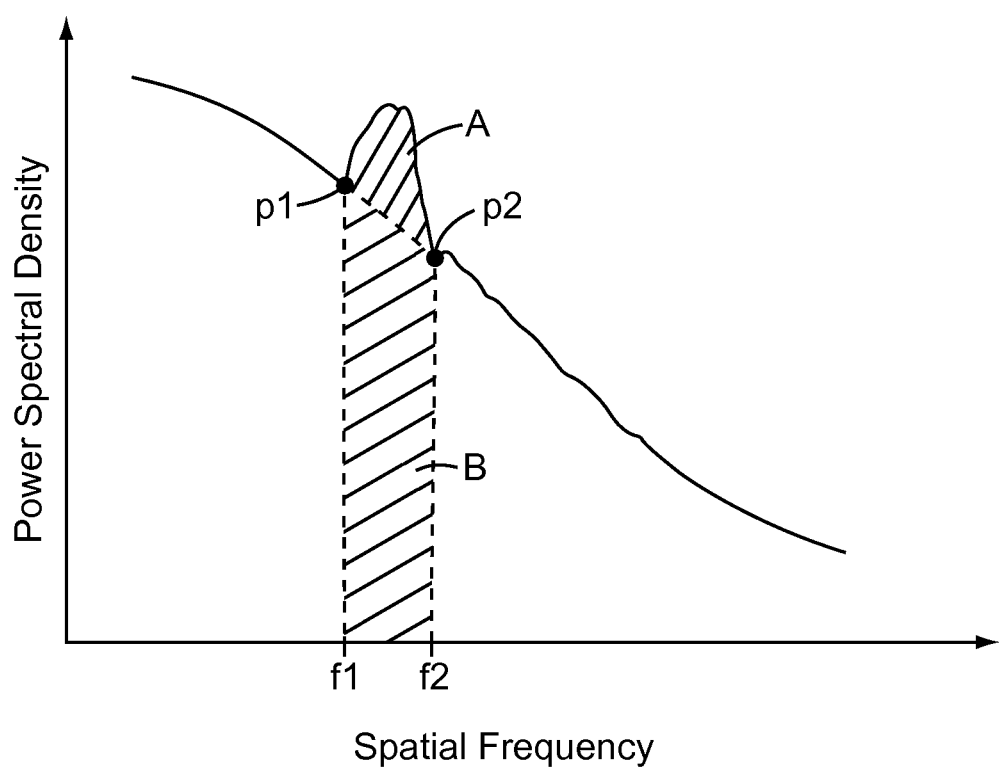
FIG. 22 is a graph of power spectral density vs. spatial frequency, the graph including a hypothetical curve used to demonstrate how the degree of irregularity or randomness of a structured surface along a given in-plane direction can be characterized by a Fourier power spectrum associated with such in-plane direction.

The tools used to make these optical diffusing film samples were made in the same manner as the tool for sample 593-2 above, except that one or more of the following were varied for the second electroplating step: the amount of organic leveler used, the current density, and the plating time. The samples themselves were then made from their respective tools via a hand spread in the same manner as sample 593-2, and the haze and clarity were measured as with the other samples. The measured values are listed in Table 2 below. An SEM image of the structured surface of film sample 502-2 is shown in FIG. 17. An SEM image of the structured surface of film sample 597-2 is shown in FIG. 22.

Samples RA13c, RA13b, RA22a, L27B, RA14b, RA24a, RA24b, N3, and N2

Figure 18:
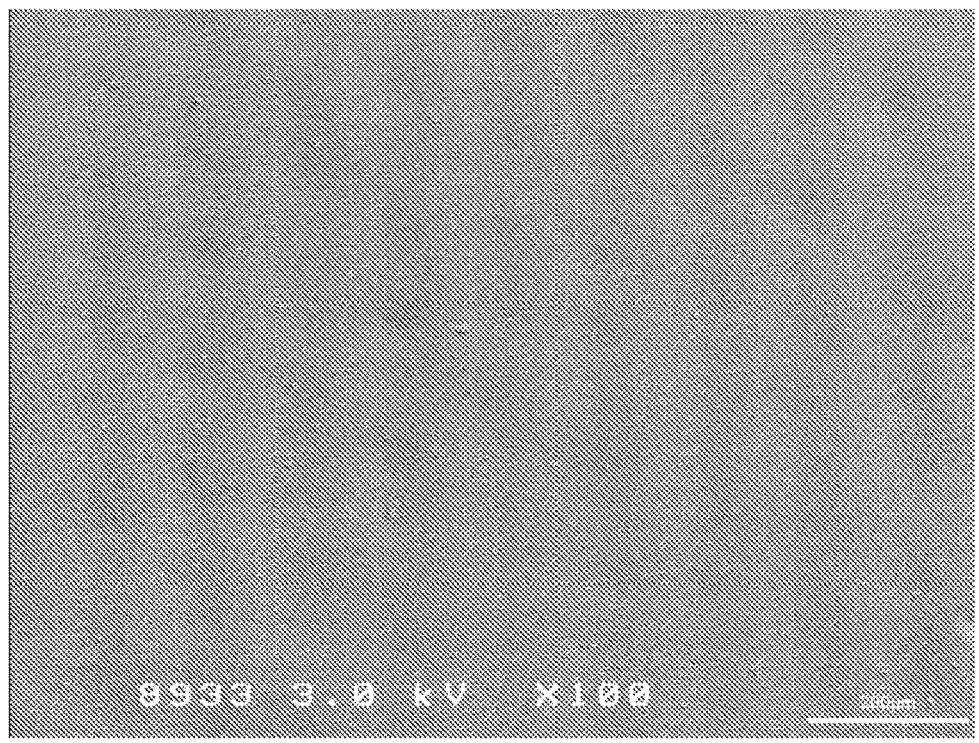
FIG. 18 is an SEM image of a representative portion of the structured surface of an optical diffusing film sample referred to as "RA13a"
Figure 20:
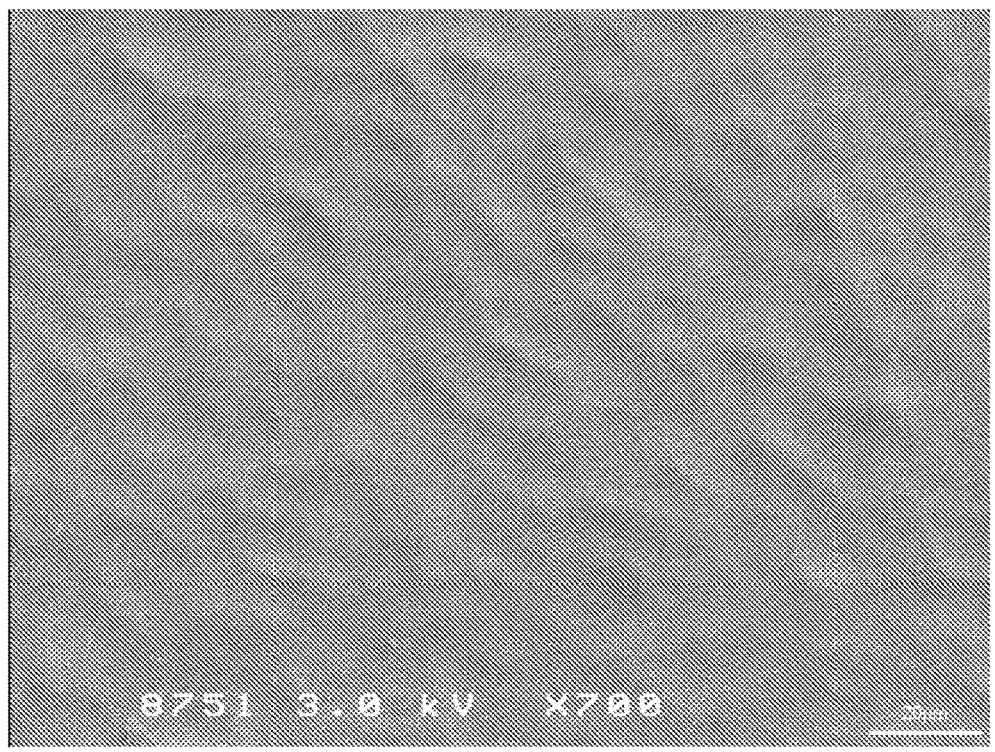
FIG. 20 is an SEM image of a representative portion of the structured surface of an optical diffusing film sample referred to as "593-2"

The tools used to make these optical diffusing film samples were made in the same manner as the tool for sample RA13a above (i.e., the fourth tool), except that (i) the copper sheet used as a starting material was flat and smooth and did not contain the periodic undulations, and (ii) one or more of the following were varied for the first or second electroplating step: the current density, and the plating time. The samples themselves were then made from their respective tools via a hand spread in the same manner as sample RA13a, and the haze and clarity were measured as with the other samples. The measured values are listed in Table 2 below. An SEM image of the structured surface of film sample RA22a is shown in FIG. 18. An SEM image of the structured surface of film sample N3 is shown in FIG. 20.

TABLE 2

Measured Optical Haze and Clarity

| Sample | Haze (%) | Clarity (%) |
|---|---|---|
| 600-2 | 1.57 | 88.3 |
| 597-2 | 2.5 | 83.1 |
| 551-2 | 5.3 | 72.5 |
| RA24b | 7.41 | 56.8 |
| N2 | 8.2 | 76.6 |
| 554-2 | 11.7 | 41.1 |
| RA24a | 12.1 | 40.4 |
| RA14b | 13.9 | 57.8 |
| L27B | 14 | 51.1 |
| 593-2 | 17.1 | 54.4 |
| N3 | 24.9 | 32.1 |
| RA13a | 25.9 | 19.4 |
| RA22a | 54.6 | 15.5 |

TABLE 2-continued

Measured Optical Haze and Clarity

| Sample | Haze (%) | Clarity (%) |
|---|---|---|
| 502-2 | 67.3 | 9 |
| 599-1 | 72.4 | 8.4 |
| RA13b | 72.5 | 9.1 |
| 551-1 | 79.4 | 10 |
| RA13c | 80 | 9.5 |
| 597-1 | 85.6 | 8.6 |
| 554-1 | 87.4 | 7.3 |
| 594-1 | 87.9 | 6.9 |
| 502-1 | 92.8 | 6.9 |
| 600-1 | 95 | 6.8 |
| 507-1 | 96.4 | 6.1 |

Figure 13:
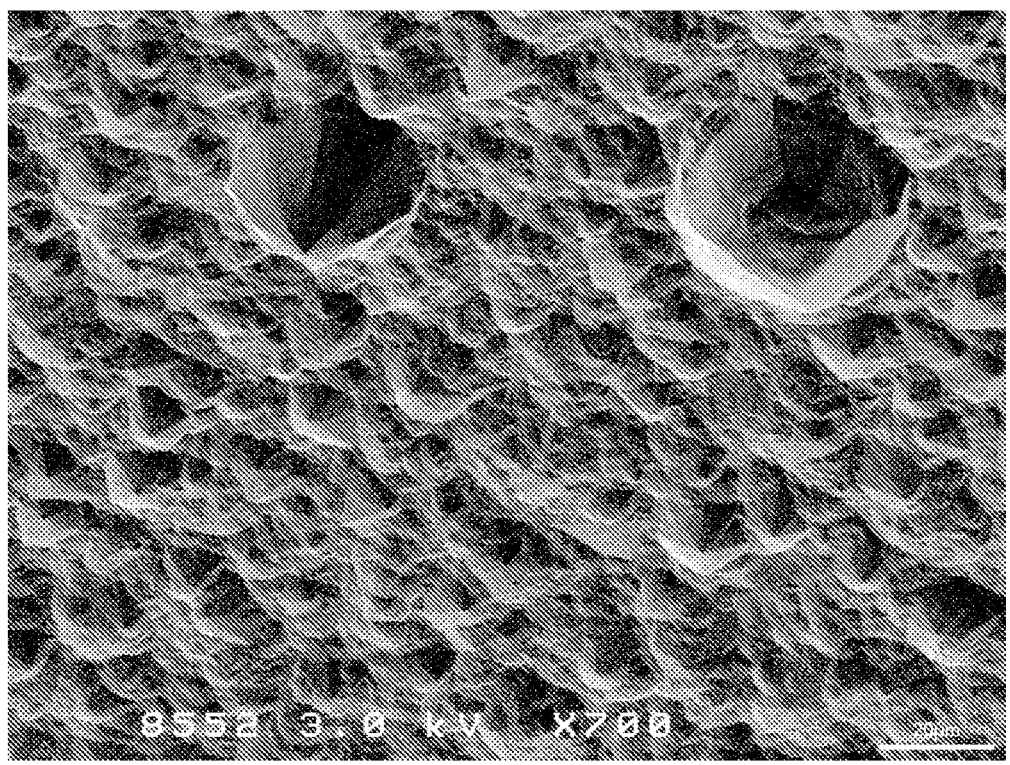
FIG. 13 is an SEM image of a representative portion of the structured surface of an optical diffusing film sample referred to as "502-1"
Figure 13A:
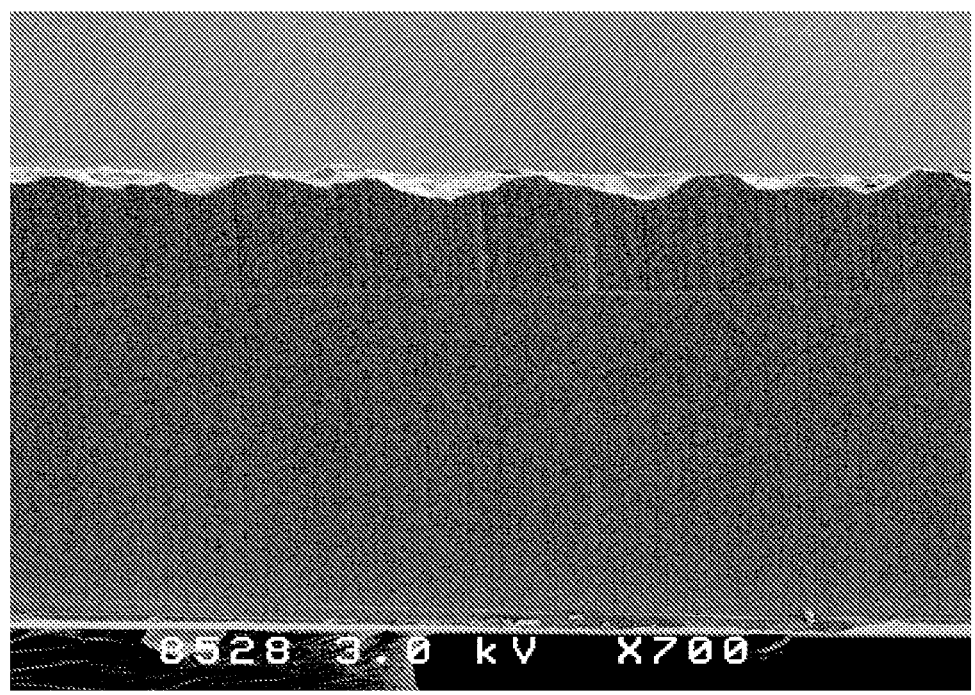
FIG. 13A is an SEM image of the 502-1 sample in cross-section.

Each optical diffusing film sample listed in Table 2 was made using a process in accordance with FIG. 9. The measured haze and measured clarity values in this table are plotted in the optical clarity vs. optical haze graph of FIG. 13. The points on the graph are labeled according to the sample designation numbers in Table 2. Of the samples listed in Table 2, SEM images of the structured surfaces are provided for: sample 502-1 (FIGS. 14, 14A); sample 594-1 (FIG. 15); sample 599-1 (FIG. 16); sample 502-2 (FIG. 17); sample RA22a (FIG. 18); sample RA13a (FIG. 19); sample N3 (FIG. 20); sample 593-2 (FIG. 21); and sample 597-2 (FIG. 22). Inspection of these images reveals one or more of:

- discernible individual structures (e.g. in the form of distinct cavities and/or protrusions) that can be seen in the structured surface;
- individual structures that are limited in size along two orthogonal in-plane directions;
- individual structures that are closely packed;
- individual structures that are rounded or curved (crater-like or dome-like, with curved base surfaces);
- individual structures that are pyramidal or flat-faceted; and
- combinations of non-uniformly arranged larger structures, and closely packed smaller structures non-uniformly dispersed between the larger structures.

Further Discussion—Structured Surface Characterization

Further analysis work was performed to identify characteristics of structured surfaces which, whether alone or in combination with other characteristics, may be used to characterize at least some of the structured surfaces made by the method of FIG. 9, and/or to distinguish at least some such structured surfaces from those of other optical diffusing films, such as SDB diffusers, DPB diffusers, CCS diffusers, Type I Microreplicated diffusing films, and Type II Microreplicated diffusing films. Several characterization parameters were studied in this regard, including:

- power spectral density (PSD) of the topography along orthogonal in-plane directions, as a measure of spatial irregularity or randomness;
- identification of individual structures (in plan view) that make up the structured surface, and measurement of the in-plane size or transverse dimension (such as ECD) of such structures;
- ratio of depth or height to in-plane size of the structures; and
- identification of ridges on the structured surface, and measurement of ridge length (in plan view) per unit area.

This further analysis work will now be discussed.

Power Spectral Density (PSD) Analysis

Part of the analysis work focused on the topography of the structured surface, and sought to determine the degree of spatial irregularity or randomness of the surface. The topography can be defined relative to a reference plane along which the structured surface extends. For example, the structured surface 820a of film 820 (see FIG. 8) lies generally in, or extends generally along, an x-y plane. Using the x-y plane as a reference plane, the topography of the structured surface 820a can then be described as the height of the surface 820a relative to the reference plane as a function of position in the reference plane, i.e., the z-coordinate of the surface as a function of (x,y) position. If we measure the topography of a structured surface in this manner, we can then analyze the spatial frequency content of the topographical function to determine the degree of spatial irregularity or randomness of the surface (or to identify spatial periodicities present in the structured surface).

Our general approach was to analyze the spatial frequency content using Fast Fourier Transform (FFT) functions. Because the topography provides height information along two orthogonal in-plane directions (x and y), the spatial frequency content of the surface is fully characterized by analyzing the spatial frequency content along each of the in-plane directions. We determined the spatial frequency content by measuring the topography over a sufficiently large, and representative, portion of the structured surface, and calculating a Fourier power spectrum for each in-plane direction. The two resulting power spectra could then be plotted on graphs of power spectral density (PSD) versus spatial frequency. To the extent the resulting curves contain any local frequency peaks (not corresponding to zero frequency), the magnitude of such a peak can be expressed in terms of a "peak ratio" described further below in connection with FIG. 22.

Having described our general approach, we now describe our approach to the PSD analysis in more detail. For a given optical diffusing film sample, a ~1×1 cm piece of the sample was cut from the central portion of the sample. The sample piece was mounted on a microscope slide, and its structured surface was Au—Pd sputter-coated. Two height profiles of the structured surface were obtained using confocal scanning laser microscopy (CSLM). Whenever possible, fields of view were chosen to give a good sampling of the topography and any periodicity that was present. The 2-dimensional (2D) power spectral density (PSD) was calculated for each 2D height profile. The 2D PSD is the square of the magnitude of the 2D spatial Fourier transform of the 2D height profile. MATLAB was used to calculate the PSD using MATALB's Fast Fourier Transform (FFT) function. Before using the FFT, a 2D Hamming window was applied to the 2D height profile to help reduce ringing in the FFT caused by the finite spatial dimensions of the 2D height profile. The 2D PSD was summed in the x-direction to give the 1-dimensional (1D) PSD in the y-direction (downweb direction). Likewise, the 2D PSD was summed in the y-direction to give the 1D PSD in the x-direction (crossweb direction).

Figure 23A:
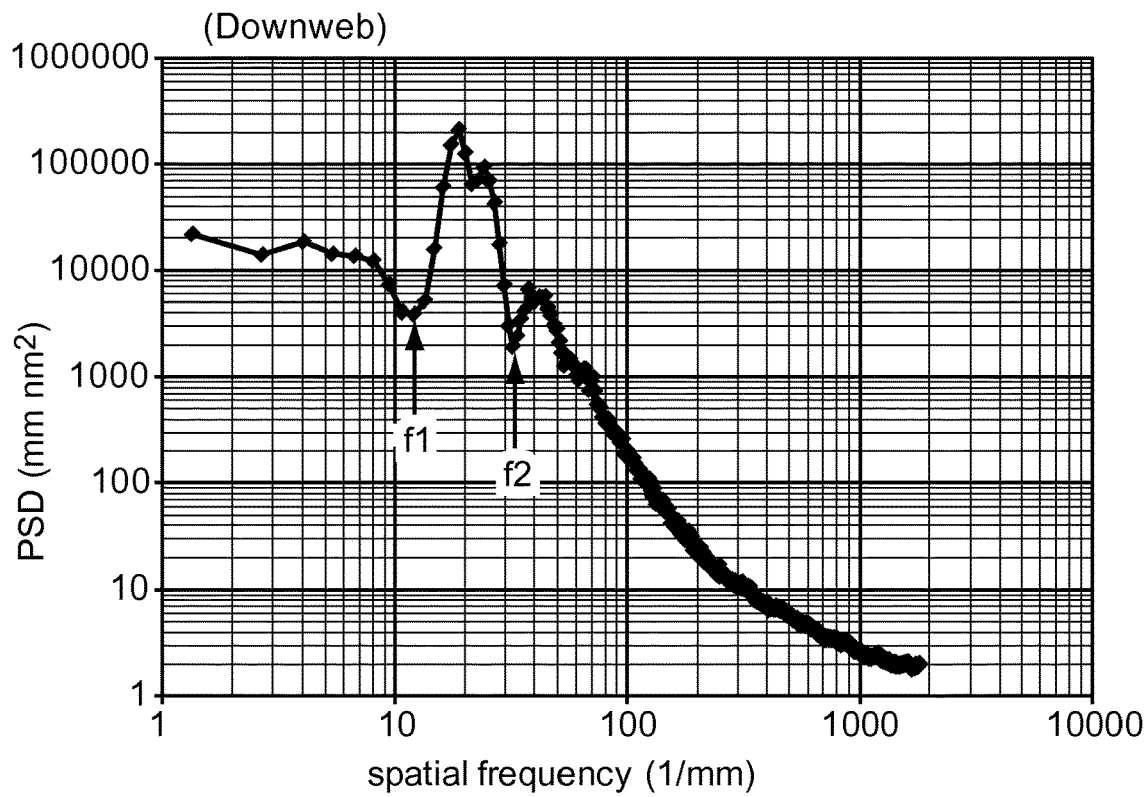
FIG. 23A is a graph of power spectral density vs. spatial frequency in a downweb direction for a sample of the Type I Microreplicated diffusing film (optical haze=91.3%, optical clarity=1.9%)
Figure 23B:
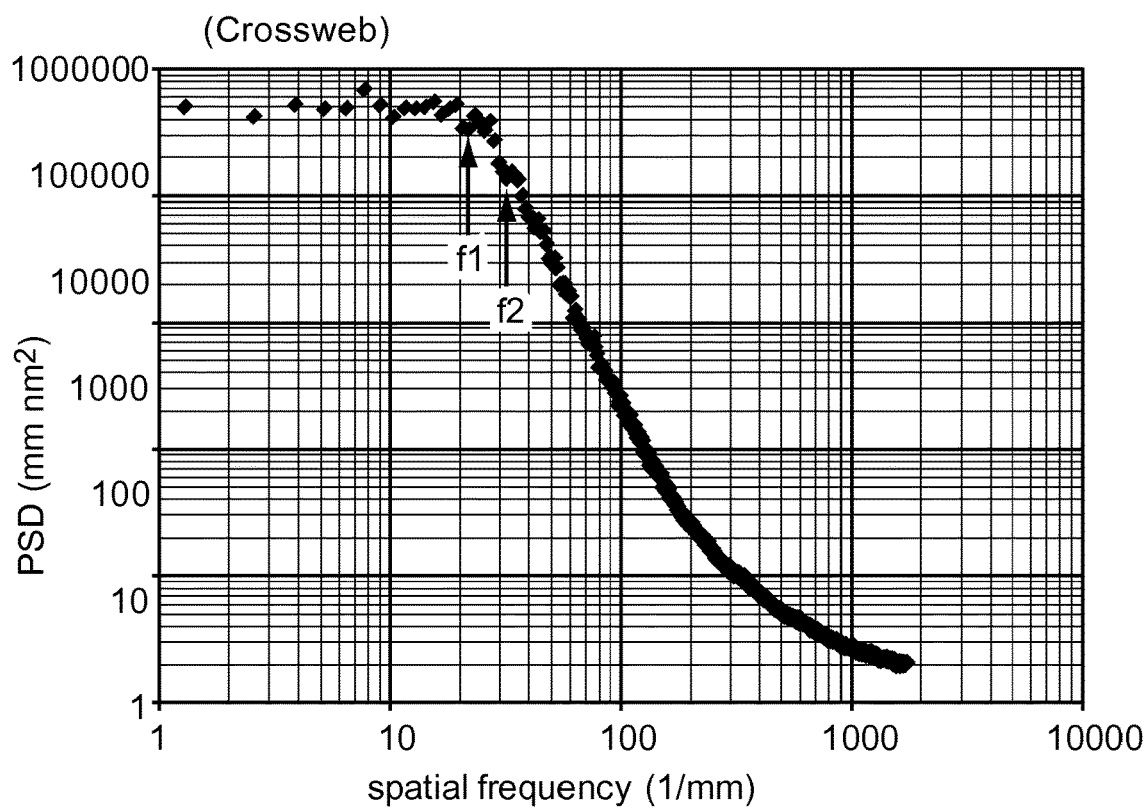
FIG. 23B is a similar graph for the same sample but in a perpendicular (crossweb) in-plane direction.

Analysis of the 1D PSDs with regard to spatial frequency peaks will now be described in connection with FIG. 23. In that figure, a hypothetical Fourier power spectrum curve is shown for illustrative purposes. The curve, which may represent either of the 1D PSD functions (x or y) discussed above, appears on a graph of power spectral density (PSD) versus spatial frequency. The vertical axis (PSD) is assumed to be plotted on a linear scale starting at zero. The curve is shown as having a frequency peak which (a) does not correspond to zero frequency, and (b) is bounded by two adjacent valleys that define a baseline. The two adjacent valleys are identified by points p1, at spatial frequency f1, and p2, at spatial frequency f2. The frequency f1 may be considered the frequency at which the peak starts, and f2 may be considered the frequency at which the peak ends. The baseline is the straight line segment (dashed line) that connects p1 and p2. Keeping in mind that the vertical axis (PSD) is on a linear scale starting at zero, the magnitude of the peak can be expressed in terms of the areas A and B on the graph. The area A is the area between the frequency peak and the baseline. The area B is the area under or beneath the baseline. That is, B=(PSD(f1)+PSD(f2))*(f2−f1)/2. The sum A+B is the area under or beneath the frequency peak. Given these definitions, the magnitude of the peak can now be defined in terms of a relative peak amplitude or "peak ratio" as follows:

peak ratio=$A/(A+B)$.

In practice, we evaluated two 1D PSDs (two Fourier power spectra—one for the x-direction, one for the y-direction) for each sample that was evaluated, and we identified, to the extent the Fourier power spectrum included any frequency peaks, the most prominent peak for each curve. The above-described peak ratio was then calculated for the most prominent peak for each curve. Since the most prominent peak was measured, the calculated peak ratio is an upper limit for all peaks that may be present in the given Fourier power spectrum.

Figure 4:
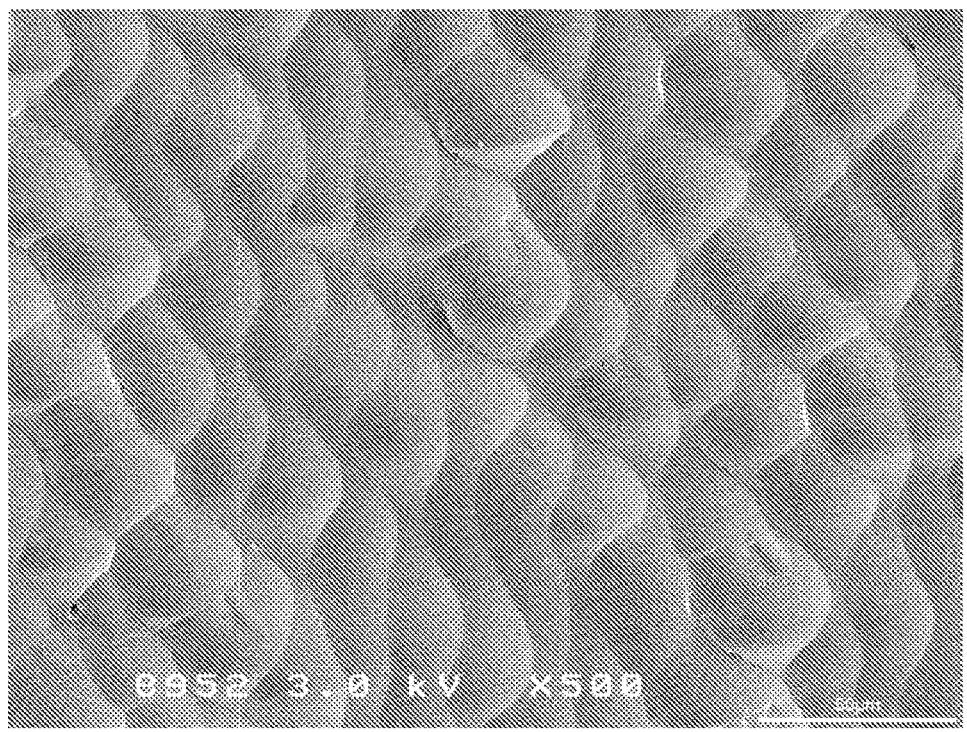
FIG. 4 is an SEM image of a portion of the structured surface of a Type I Microreplicated diffusing film (optical haze=91.3%, optical clarity=1.9%).

These PSD measurements were performed not only on optical diffusing films made according to the method of FIG. 9, but also on two Type I Microreplicated diffusing film samples. The two Type I Microreplicated diffusing film samples were made in general accordance with the teachings of the '622 Aronson et al., '593 Yapel et al., '475 Barbie, and '261 Aronson et al. references cited above, these two samples referred to herein as "Type I Micro—1" and "Type I Micro—4". These samples were made under differing conditions, and had different haze values. In particular, the Type I Micro—1 sample had a haze of 91.3% and clarity of 1.9%, and the Type I Micro—4 sample had a haze of 79.1% and a clarity of 4.5%. The SEM image in FIG. 4 is a picture of the Type I Micro—1 sample.

Figure 24A:
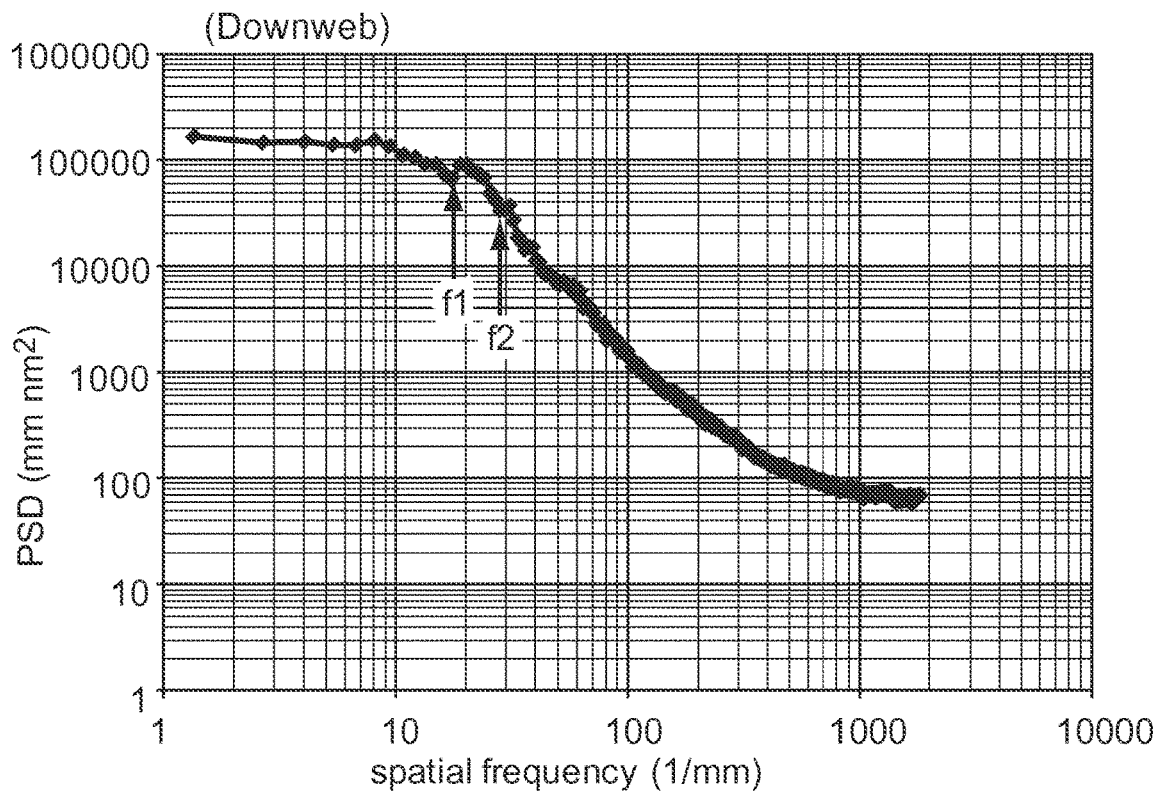
FIG. 24A is a graph of power spectral density vs. spatial frequency in a downweb direction for the optical diffusing film sample 502-1.
Figure 24B:
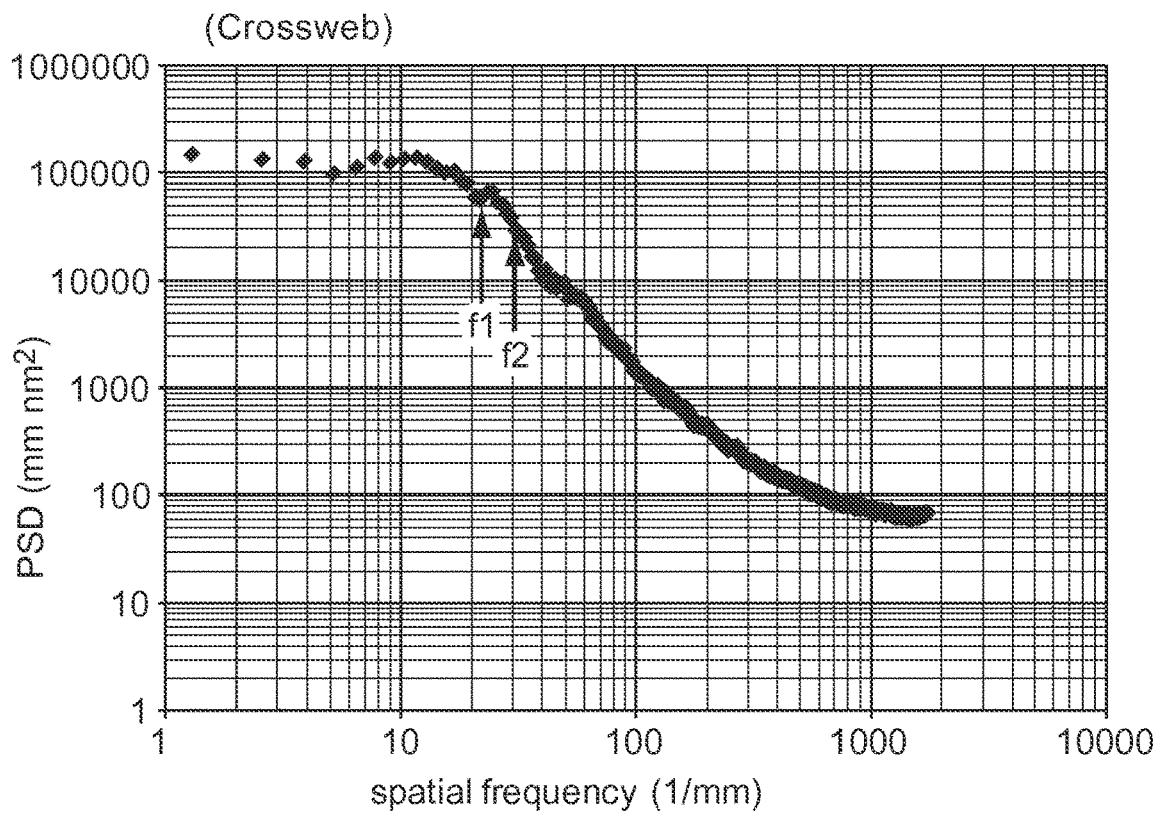
FIG. 24B is a similar graph for the same sample but in the crossweb direction.

FIGS. 24A and 24B are graphs, for the downweb and crossweb in-plane directions respectively, of power spectral density vs. spatial frequency for the Type I Micro—1 sample. In each graph, "f1" and "f2" are the frequencies at which the most prominent peak was determined to start and end, respectively. Although these graphs use a logarithmic scale for the power spectral density (PSD), the A and B values used for the calculation of peak ratio were calculated based on a linear PSD scale, consistent with the description above.

FIGS. 24A and 24B are graphs for the downweb and crossweb directions respectively of power spectral density vs. spatial frequency for the optical diffusing film sample 502-1. The labels "f1" and "f2" have the same meanings in these figures as in FIGS. 22, 23A, and 23B. The A and B values used to calculate peak ratio were based on a linear PSD scale, even though a log scale is used in FIGS. 24A, 24B.

The calculated PSD peak ratios for seven of the optical diffusing films made in accordance with the method of FIG. 9, and for the two Type I Microreplicated diffusing film samples, are listed in Table 3.

TABLE 3

Measured PSD Peak Ratios

| Sample | Measured peak ratio (downweb) | Measured peak ratio (crossweb) |
|---|---|---|
| 502-1 | 0.24 | 0.15 |
| 594-1 | 0.12 | 0.23 |
| 502-2 | 0.10 | 0.17 |
| 593-2 | 0.19 | 0.12 |
| RA22a | 0.21 | 0.11 |
| RA13a | 0.14 | 0.76 |
| N3 | 0.08 | 0.21 |
| Type I Micro - 1 | 0.94 | 0.19 |
| Type I Micro - 4 | 0.99 | 0.84 |

In reviewing the results of Table 3, we see that for each of the optical diffusing films made in accordance with FIG. 9, the peak ratio for both in-plane directions (downweb and crossweb) is less than 0.8, and, in most cases, much less than 0.8. In comparison, although the Type I Micro—1 sample had a peak ratio of 0.19 in the crossweb direction, in all other cases the tested Type I Microreplicated diffusing films had peak ratios greater than 0.8. Thus, neither of the tested Type I Microreplicated diffusing films satisfies the condition that the peak ratio for both in-plane directions is less than 0.8.

In reviewing the results of Table 3, we also see that all except one of the tested film samples made in accordance with FIG. 9 also satisfy a more stringent condition that the peak ratio for both in-plane directions is less than 0.5, or 0.4, or 0.3. The relatively small values for peak ratio in both in-plane directions are suggestive of ultra-low spatial periodicity in the structured surfaces. The sample RA13a, however, does not meet the more stringent conditions. Out of all the tested film samples made in accordance with FIG. 9, the RA13a sample has by far the highest measured peak ratio, a ratio of 0.76 in the crossweb direction. In the orthogonal in-plane direction, the RA13a sample has a much smaller 0.14 peak ratio. Recall from the description above that the RA13a sample was made with a copper sheet starting material that contained periodic undulations, and these periodic undulations were transferred to the structured major surface of the RA13a sample during microreplication. In view of this, it is reasonable to conclude that if the substrate for RA13a had been substantially flat with no undulations, the peak ratio in the crossweb direction would be much closer to the downweb peak ratio of 0.14. Stated differently, to the extent a tool made in accordance with FIG. 9 is made using a flat substrate that has no underlying structure, such a tool (and any optical film made from the tool) is likely to have PSD peak ratios in both in-plane directions of less than 0.8, or 0.5, or 0.4, or 0.3.

Similarly, to the extent a tool made in accordance with FIG. 9 is made using a substrate that has significant underlying structure (whether periodic undulations, or more defined structure such as a prismatic BEF structured surface), such a tool (and any optical film made from the tool) is likely to exhibit a significant or large peak in the power spectral density curve for at least one in-plane direction, and is likely to have a significant or large PSD peak ratio in such in-plane direction. In such cases, by engaging in a more in-depth analysis of the PSD measurements, particularly if information is available about the underlying structure in the original substrate, one may distinguish between peaks in the power spectral density curve that are due to the underlying structure of the substrate used to form the tool, and peaks that are due to the structures that were formed as a result of the electroplating steps (see steps 903 and 904 in FIG. 9).

Making such a distinction may be complex, because the spatial periodicit(ies) of the underlying structure need not be significantly different than any spatial periodicit(ies) of the electroplated structure, in fact, the spatial periodicities of these different structures types may in at least some cases substantially overlap. Nevertheless, if one succeeds in making such a distinction, then the condition for a structured surface that the PSD peak ratios in both in-plane directions be less than 0.8 (or 0.5, or 0.4, or 0.3) may still be satisfied by a structured surface that was made in accordance with FIG. 9 using a substrate with significant underlying structure, provided that any peaks in the power spectral density curves that are due to the underlying structure are disregarded.

The results given in Table 3 were obtained by identifying a most prominent peak, if present, in the power spectral density curve. And data for the power spectral density curves, as can be seen in FIGS. 23A through 24B, extended over a spatial frequency range from roughly 1 $min^{-1}$ to almost 2000 $mm^{-1}$, hence, any peaks that may be present throughout that range are candidates in the determination of which peak is the most prominent, and they are also candidates with respect to the criterion that the PSD peak ratios in both in-plane directions are less than 0.8 (or 0.5, or 0.4, or 0.3). In practice, it may be advantageous to limit the spatial frequency range over which peaks in the power spectral density curves are considered for these analyses. For example, it may be advantageous to limit the spatial frequency range over which the PSD peak ratios in both in-plane directions are specified to be less than 0.8 (or 0.5, or 0.4, or 0.3), to a frequency range whose upper limit is 1000, or 500, or 100 $mm^{-1}$, and whose lower limit is 1, or 2, or 5 $mm^{-1}$.

Transverse Dimension or Size (ECD) Analysis

Figure 25:
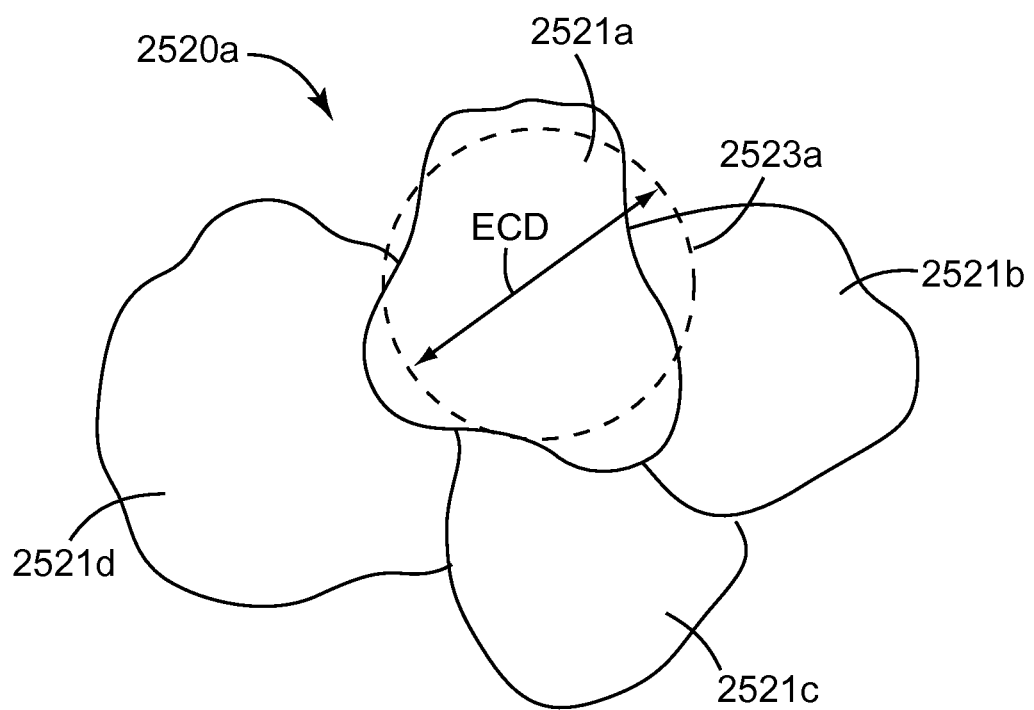
FIG. 25 is a schematic plan view of a portion of a hypothetical structured surface with distinguishable structures, demonstrating the concept of equivalent circular diameter (ECD)

For a structured surface in which distinct individual structures can be identified, the structured surface can be described in terms of a characteristic size, such as a transverse or in-plane dimension, of the structures. Each structure may for example be characterized as having a largest transverse dimension, a smallest transverse dimension, and an average transverse dimension. If the individual structures are limited in size along two orthogonal in-plane directions, e.g., not extending indefinitely in a linear fashion along any in-plane direction, each structure may be characterized as having an equivalent circular diameter "ECD". The ECD of a given structure may be defined as the diameter of a circle whose area in plan view is the same as the area in plan view of the structure. For example, with reference to FIG. 25, a plan view of a hypothetical structured surface 2520a is shown. The structured surface comprises distinguishable structures 2521a, 2521b, 2521c, 2521d, which may be protrusions or cavities. A circle 2523a is superimposed on the structure 2521a, the circle allegedly having in this plan view an area equal to that of the structure 2521a. The diameter (ECD) of the circle 2523a is the equivalent circular diameter (ECD) of the structure 2521a. By averaging the ECD values for all of the structures in a representative portion of the structured surface, the structured surface or structures thereof may then be said to have an average equivalent circular diameter $ECD_{avg}$.

Figure 26:
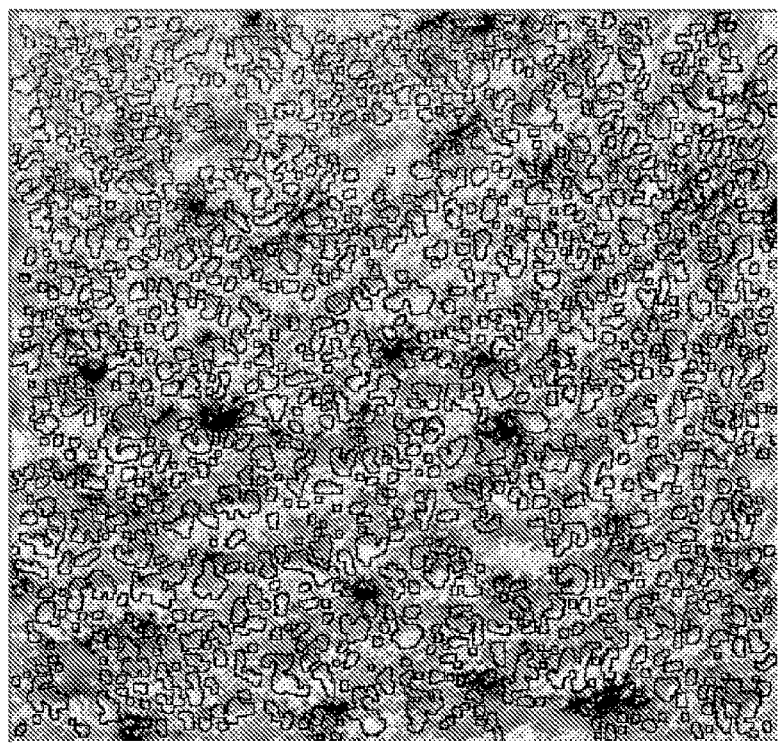
FIG. 26 is a composite image of a picture of the CCS diffuser through a confocal microscope, on which dark shapes representing the outer boundaries or edges of individual structures of the structured surface are superimposed.
Figure 27:
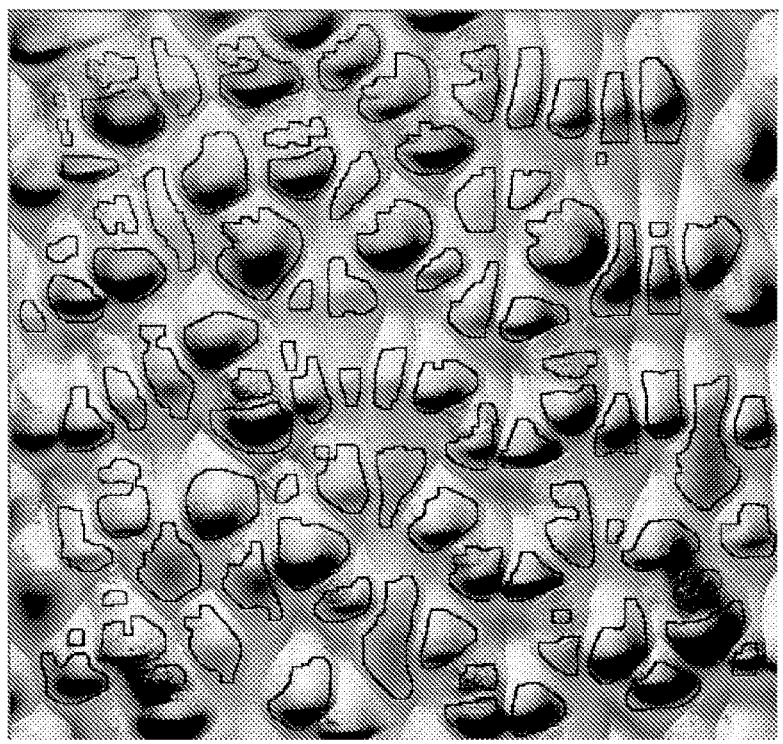
FIG. 27 is a composite image of a picture of a Type I Microreplicated diffusing film sample (optical haze=91.3%, optical clarity=1.9%) through a confocal microscope, on which dark shapes representing the outer boundaries or edges of individual structures of the structured surface are superimposed.
Figure 28:
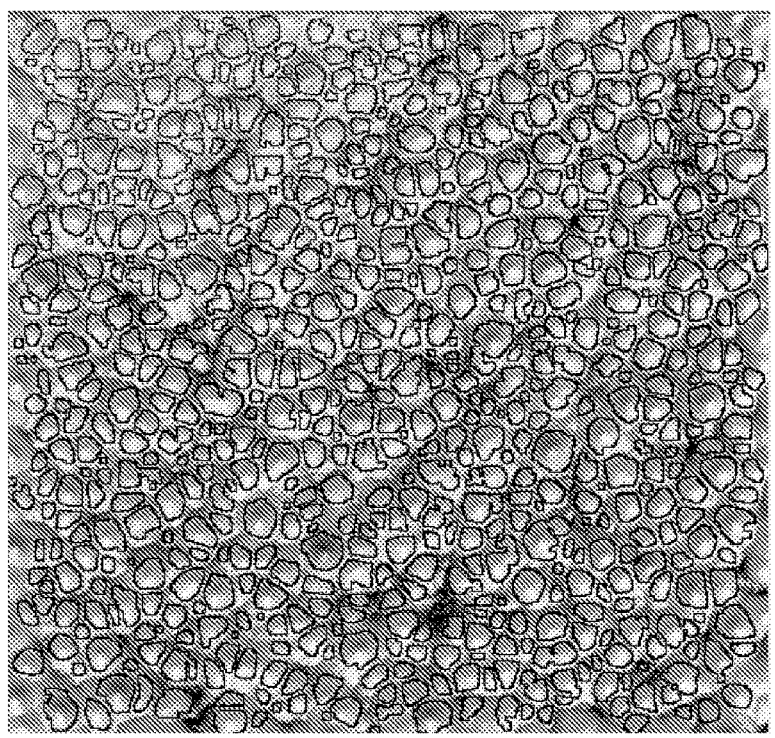
FIG. 28 is a composite image similar to FIGS. 26 and 27, but for the optical diffusing film sample 594-1.
Figure 29:
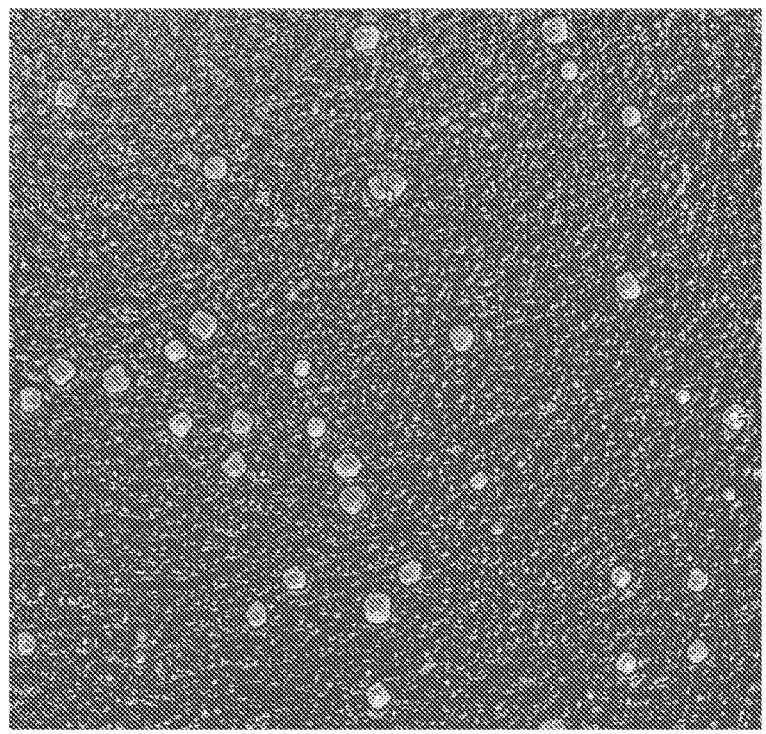
FIG. 29 is a composite image similar to FIGS. 26 through 28, but for the optical diffusing film sample 502-1.

We undertook a systematic analysis of structure size for a number of optical diffusing films. For a given optical diffusing film sample, a ~1×1 cm piece of the sample was cut from the central portion of the sample. The sample piece was mounted on a microscope slide, and its structured surface was Au—Pd sputter-coated. Two height profiles of the structured surface were obtained using confocal scanning laser microscopy (CSLM). Whenever possible, fields of view were chosen to give a good sampling of the topography. Depending on what type of structure was predominant in the sample, either peaks or valleys were sized. A consistent and repeatable methodology was established for sizing the individual structures that were identified on the structured surface. The composite images of FIGS. 26-29 provide an indication of how this was done. In these composite images, dark outline shapes are superimposed on a picture of the structured surface through a confocal microscope. The dark outline shapes are the computed outer boundaries or edges of individual structures of the structured surface. FIG. 26 is such a composite image for the CCS diffuser. FIG. 27 is for the Type I Micro—1 sample discussed above. FIG. 28 is for the optical diffusing film sample 594-1. FIG. 39 is for the optical diffusing film sample 502-1. Using such images and techniques, the ECD of typically hundreds and in some cases thousands of structures was calculated for a given structured surface. The ECD measurements and measurement statistics are summarized as follows:

TABLE 4

Measured ECD Statistics

| Sample | ECD mean (um) | ECD median (um) | ECD sigma (um) |
|---|---|---|---|
| 502-1 | 10.3 | 9.7 | 3.6 |
| 594-1 | 6.1 | 6.1 | 2.6 |
| 593-2 | 5.8 | 5.5 | 2.5 |
| RA13a | 58.3 | 58.5 | 17.5 |
| N3 | 6.3 | 6.0 | 3.3 |
| Type I Micro - 1 | 15.0 | 15.8 | 4.7 |
| Type I Micro - 2 | 15.3 | 17.3 | 5.6 |
| Type I Micro - 3 | 16.5 | 17.8 | 4.6 |
| Type I Micro - 4 | 16.8 | 17.5 | 3.5 |
| Type I Micro - 5 | 17.6 | 18.1 | 3.5 |
| Type I Micro - 6 | 17.5 | 18.3 | 4.2 |
| Type II Micro | 9.2 | 8.8 | 2.8 |
| CCS Diffuser | 3.6 | 3.0 | 2.0 |

The samples Type I Micro—2, Type I Micro—3, Type I Micro—5, and Type I Micro—6 are additional Type I Microreplicated diffusing film samples that were made in general accordance with the teachings of the '622 Aronson et al., '593 Yapel et al., '475 Barbie, and '261 Aronson et al. references cited above. The Type I Micro—2 sample had a haze of 90.7% and clarity of 2.9%, the Type I Micro—3 sample had a haze of 84.8% and a clarity of 4.7%, the Type I Micro—5 sample had a haze of 73.9% and a clarity of 5.5%, and the Type I Micro—6 sample had a haze of 68.2% and a clarity of 4.9%. The Type II Micro sample in Table 4 was an optical diffusing film similar to the Type II Microreplicated diffusing film shown in FIG. 5, but the Type II Micro sample of Table 4 had a haze of 91.1% and a clarity of 9.8%.

In reviewing the results of Table 4, we see that, except for the RA13a sample, each of the optical diffusing films made in accordance with FIG. 9 had an average (mean) ECD of less than 15 microns, and most had an average ECD of less than 10 microns, or in a range from 4 to 10 microns. This was in contrast to the average ECD of the Type II Microreplicated diffusing film samples, which was generally at least 15 microns or more. The RA13a sample had a substantially higher average ECD than any of the other films made in accordance with FIG. 9. The periodic undulations of the RA13a sample discussed above are believed to be the reason for this large difference. That is, it is reasonable to conclude that if the substrate for RA13a had been substantially flat with no undulations, the average ECD would have been much closer to that of the other similarly fabricated films, e.g., less than 15 and less than 10 microns.

Figure 30:
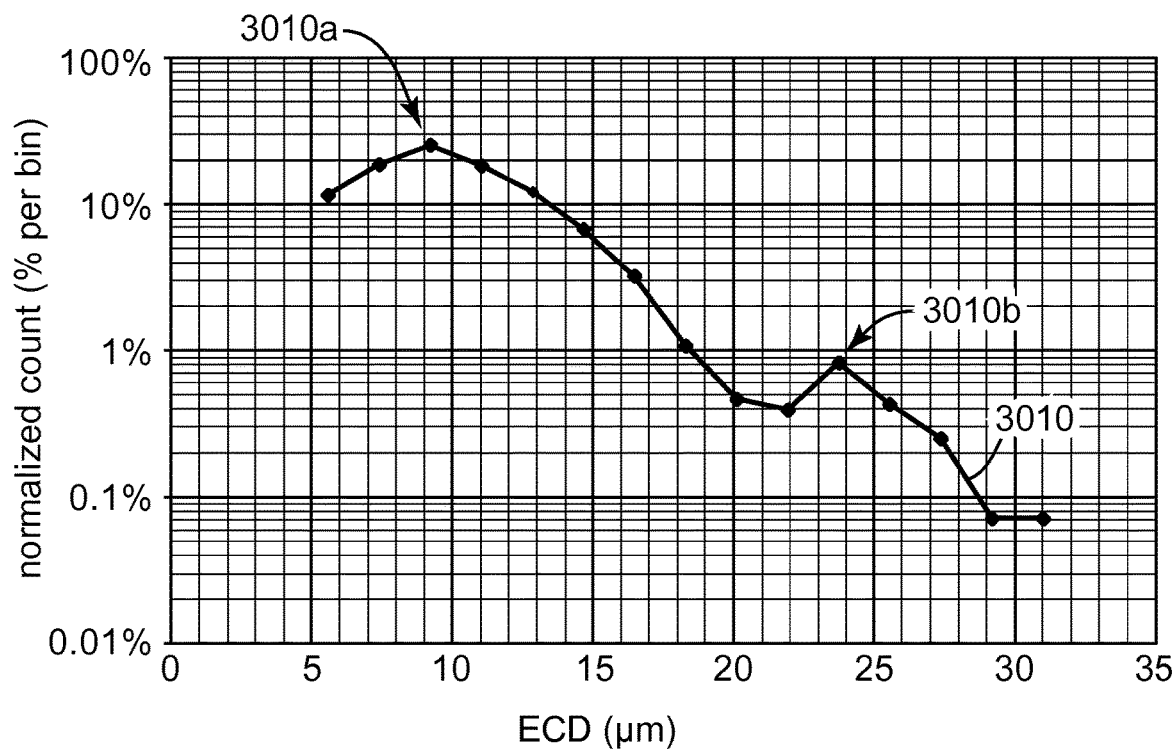
FIG. 30 is a graph of normalized count versus ECD for a representative sampled area of the optical diffusing film sample 502-1.
Figure 31:
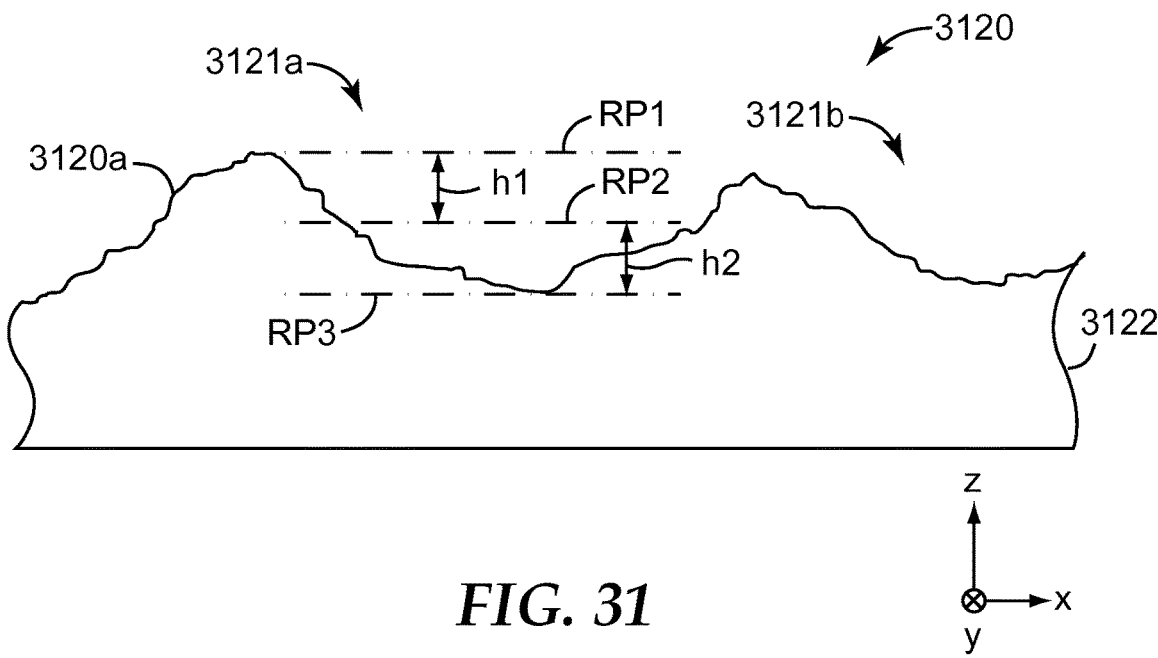
FIG. 31 is a schematic side or sectional view of a portion of a hypothetical structured surface with distinguishable structures, demonstrating the concept of maximum height or depth.

The structured surfaces of some of the samples made by the method of FIG. 9 were observed to contain a combination of irregularly arranged larger pyramidal structures, between which closely-packed smaller structures were irregularly dispersed. One such sample was 502-1. An analysis of the structured surface was done, and the results, shown as curve 3010 in the graph of FIG. 30, demonstrate that the surface has a bimodal distribution of structure sizes. The graph of FIG. 31 plots the normalized count (in percent per bin) as a function of ECD in microns. Curve 3010 is seen to have a larger peak 3010a and a smaller peak 3010b. The larger peak 3010a is located at about ECD=8 microns, and corresponds to the smaller structures on the structured surface. The smaller peak 3010b is located at about ECD=24 microns, and corresponds to the larger pyramidal structures. Thus, the average size of the smaller structures is less than 15 microns, and less than 10 microns, and the average size of the larger structures is greater than 15 microns, and greater than 20 microns. Due to the smaller population of the larger structures, the average ECD for all structures (large and small) on the structured surface is 10.3 microns, as reported in Table 4.

Aspect Ratio of Height to Transverse Dimension (ECD) Analysis

Some of the films made by the method of FIG. 9 had structured surfaces in which individual structures were closely packed and, in some cases, the structures were also curved or had curved base surfaces. We decided to investigate the relationship between the in-plane or transverse dimension (e.g. ECD) of the structures and the mean height of the structures. In general, the term "height" is broad enough to refer to the height of a protrusion as well as to the depth of a cavity. For comparison purposes we included in our investigation the DPB diffuser, which has a densely-packed beaded surface.

The height of an exemplary structure is illustrated in the drawing of a hypothetical structured surface in FIG. 31. In the figure, an optical diffusing film 3120 includes a patterned layer 3122 with a structured major surface 3120a. The structured surface 3120a includes discernible individual structures 3121a, 3121b. The structured surface extends along or defines an x-y plane. Three reference planes parallel to the x-y plane are shown: RP1, RP2, and RP3. The reference planes RP1, RP3 may be defined in terms of the highest and lowest portions (respectively) of the structure 3121a. The reference plane RP2 may be located at a position corresponding to zero or near-zero curvature, i.e., the surface at that position is neither curved inwardly, as at the top of a peak, nor curved outwardly, as at the bottom of a cavity. Given these reference planes, one can define a height h1 between RP1 and RP2, and a height h2 between RP2 and RP3.

We undertook a systematic analysis of determining an aspect ratio of structures on a given structured surface, the aspect ratio being the height divided by the ECD of the structure. For the height of the structure, we elected to use a value corresponding substantially to h1 shown in FIG. 31. For a given optical diffusing film sample, a ~1×1 cm piece of the sample was cut from the central portion of the sample. The sample piece was mounted on a microscope slide, and its structured surface was Au—Pd sputter-coated. Two height profiles of the structured surface were obtained using confocal scanning laser microscopy (CSLM). Whenever possible, fields of view were chosen to give a good sampling of the topography. Valleys (cavities) in the structured surfaces were sized; however, when evaluating the structured surface of the DPB diffuser, the height profile of the structured surface was inverted before sizing to convert peaks to valleys, for ease of calculation. As was done with the ECD measurements described above, a consistent and repeatable methodology was established for sizing the individual structures that were identified on the structured surface. The methodology was then modified to add the measurement of the height to diameter aspect ratio (Hmean/ECD). The ratio was calculated for each structure (valley region). The height Hmean was the mean height on the perimeter of the structure (valley region) minus the minimum height in the structure (valley region). The height map in the valley region was tilt corrected using the data points on the perimeter before the height was measured. The mean aspect ratios for the tested samples were calculated, and are shown in Table 5.

TABLE 5

| Aspect Ratio | |
| --- | --- |
| Sample | mean aspect ratio |
| 502-1 | 0.078 |
| 594-1 | 0.069 |
| 597-2 | 0.006 |
| DPB diffuser | 0.210 |

In reviewing the results of Table 5, we see that the samples made by the method of FIG. 9 can be readily distinguished from the DPB diffuser on the basis of aspect ratio. For example, the average aspect ratio of the former samples is less than 0.15, or less than 0.1.

Ridge Analysis

As mentioned above, some of the films made by the method of FIG. 9 had structured surfaces in which individual structures were closely packed. The closely packed structures tend to produce ridge-like features, although ridge-like features may also occur in the absence of closely packed structures. We decided to investigate aspects of ridges on structured surfaces. In particular, we investigated the extent to which ridges were present on the structured surface. We quantified this by calculating the total ridge length per unit area of structured surface in plan view. This was done for many of the samples made according to the method of FIG. 9, and, for comparison purposes, we also included several beaded diffusers: the SDB diffuser, the CCS diffuser, and the DPB diffuser.

Figure 32:
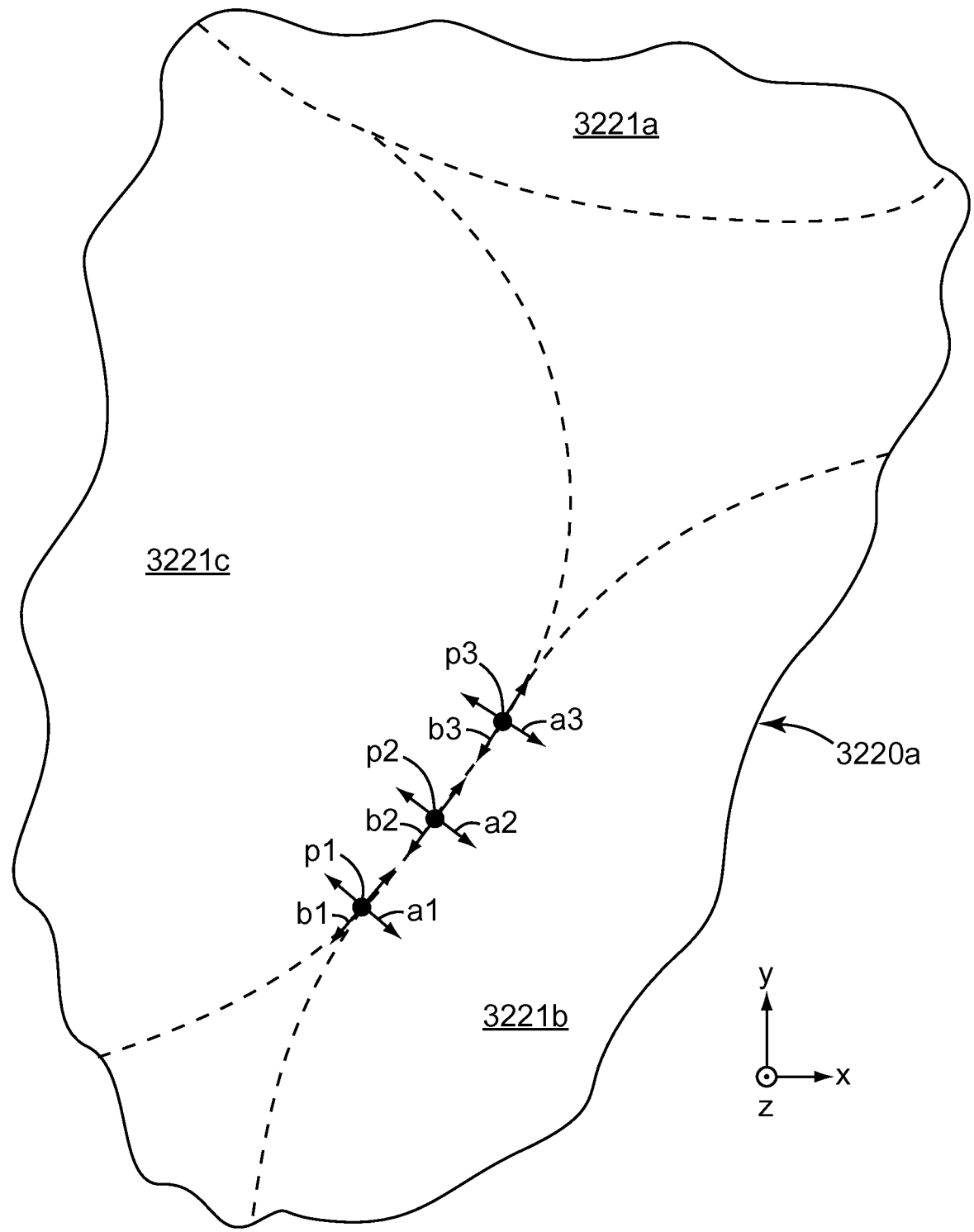
FIG. 32 is a schematic plan view of hypothetical individual structures on a structured surface, demonstrating criterion used to determine the presence of a ridge on the structured surface.

A ridge is illustrated in the drawing of a hypothetical structured surface in FIG. 32. In the figure, an optical diffusing film includes a structured major surface 3220a. The structured surface 3220a includes discernible individual structures 3221a, 3221b, 3221c. The structured surface extends along or defines an x-y plane. A ridge, which may be described as a long, sharp, peaked region, is formed along at least a short segment at which the boundaries of the structures 3221a, 3221b come together. The ridge or segment includes points p1, p2, p3. The local slope and curvature at each of these points, based on the known topography, can be calculated along directions (see axes a1, a2, a3) that are parallel to a gradient and perpendicular to the ridge, as well as along directions (see axes b1, b2, b3) that are perpendicular to the gradient and parallel to the ridge. Such curvatures and slopes can be used to confirm that the points lie on a long, sharp peaked region. For example, points on the ridge may be identified by: a sufficiently different curvature along the two perpendicular directions (e.g. a1, b1); a sharp curvature perpendicular to the ridge (e.g. a1); a slope in the gradient direction (e.g. along the ridge, see b1) that is less than the average slope; and a segment length that is sufficiently long.

We undertook a systematic analysis of determining the ridge length per unit area on a given structured surface using the foregoing principles. For a given optical diffusing film sample, a ~1×1 cm piece of the sample was cut from the central portion of the sample. The sample piece was mounted on a microscope slide, and its structured surface was Au—Pd sputter-coated. Two height profiles of the structured surface were obtained using confocal scanning laser microscopy (CSLM). Whenever possible, fields of view were chosen to give a good sampling of the topography. Ridge analysis was used to analyze the height profiles in accordance with the above principles.

The ridge analysis identified the peaks of ridges on a 2D height map and calculated the total length of ridges per unit sample area. Curvature along the gradient direction and transverse to the gradient direction was calculated about each pixel. Thresholding on the curvature and slope were carried out to identify ridges.

The following is the definition of a ridge that was used in the ridge analysis.

1. Curvature definitions: (a) gcurvature is the curvature along the gradient direction; (b) tcurvature is the curvature along the direction transverse (perpendicular) to the gradient direction; (c) gcurvature is calculated by using three points along the gradient and calculating the circle that circumscribes the three points; the gcurvature=1/R, where R is the radius of this circle; (d) tcurvature is calculated by using three points along the direction transverse to the gradient and calculating the circle that circumscribes the three points; the gcurvature=1/R, where R is the radius of this circle; (e) the curvature is assigned to the center point of these three points; (f) the spacing of the three points is chosen to be large enough to reduce the contribution by fine features that are not of interest but small enough so that the contribution by features of interest is preserved.
2. The curvature of a point on the ridge is sufficiently different between two perpendicular directions. (a) The gcurvature and tcurvature differ by at least a factor of 2 (either can be larger).
3. The ridge is sharper than most of the valleys. (a) Curvature is greater than the absolute value of the 1 percentile point of the gcurvature distribution (1% of the gcurvature is lower than the 1 percentile point).
4. The slope is lower than the mean slope. (a) gslope (slope along the gradient) on ridge is less than the mean gslope of the surface. (b) The slope on the top of a ridge is typically near zero unless it is on a highly sloped surface.
5. The ridge is sufficiently long. (a) A potential ridge is not considered a ridge if its total length (including branches) is shorter than the mean radius of curvature along the potential ridge top; (b) A potential ridge is not considered a ridge if its total length is shorter than 3 times the mean width of the potential ridge; (c) Note that these dimensions are measured approximately.
6. Branches are sufficiently long. (a) A branch from the midsection of a ridge is considered a continuation of the ridge if it is longer than 1.5 times the mean width of the ridge. Otherwise, it is removed; (b) Note that these dimensions are measured approximately.

Figure 33A:
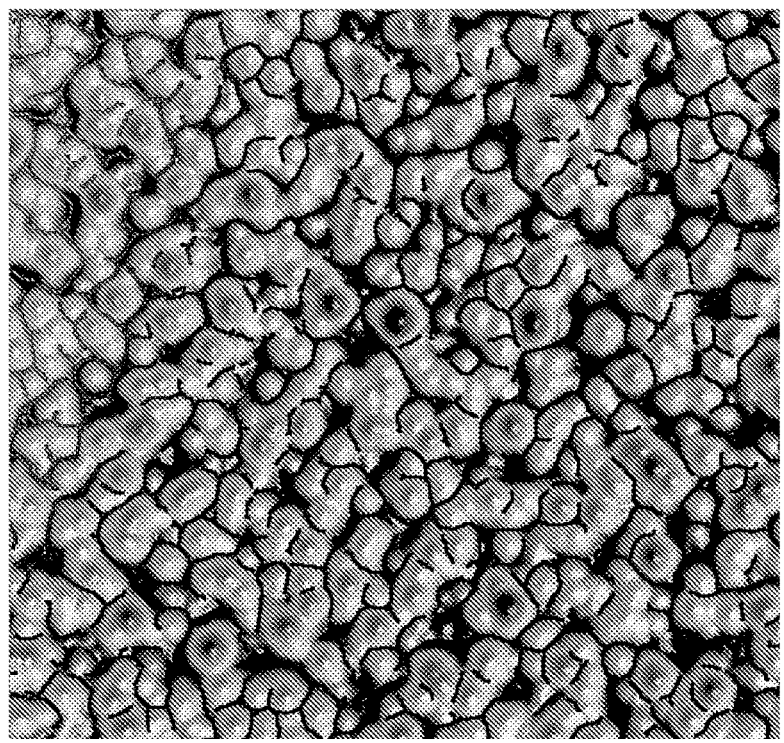
FIG. 33A is a composite image of a picture of the optical diffusing film sample 594-1 through a confocal microscope, on which dark line segments representing ridges that were detected on the structured surface are superimposed.
Figure 33B:
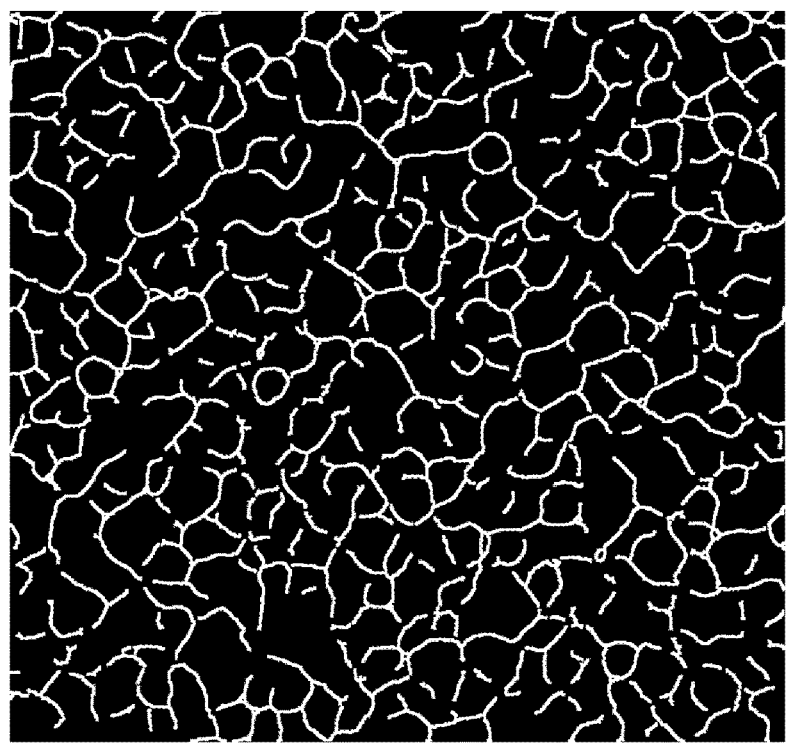
FIG. 33B is an image that shows only the dark line segments of FIG. 34a, i.e., only the detected ridges, in reverse printing (dark/light reversed)
Figure 34A:
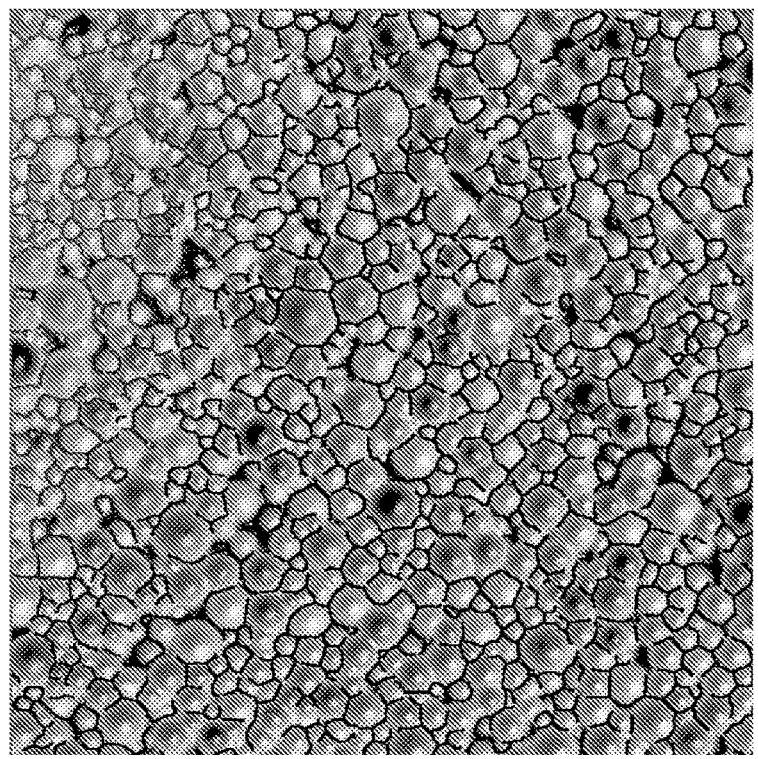
FIGS. 34A and 34B are analogous to FIGS. 33A and 33B respectively, but for the DPB diffuser.
Figure 34B:
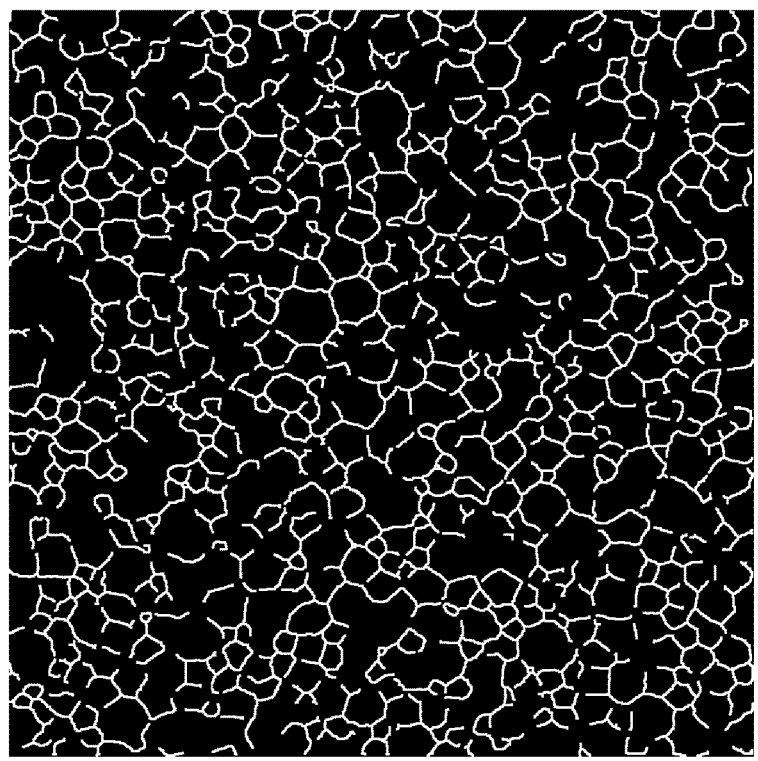

The composite images of FIGS. 33A and 34A provide an indication of how the systematic ridge identification was done. In these composite images, dark line segments are superimposed on a picture of the structured surface through a confocal microscope. The dark line segments are areas of the structured surface identified as ridges. FIG. 33A is such a composite image for the 594-1 sample. FIG. 34A is for the DPB diffuser. FIG. 33B corresponds to FIG. 33A, but shows only the dark line segments (i.e. the detected ridges) but in reverse printing so the ridges can be more easily seen. FIG. 34B likewise corresponds to FIG. 34A, but shows only the dark line segments and in reverse printing.

After identifying the ridges, the total length of all the ridges in the height map was calculated and divided by the area of the height map. This analysis was also repeated for identifying valley ridges by inverting the height maps before running the analysis. Note that the DPB sample was inverted to begin with. Using such images and techniques, the ridge length per area was calculated for the tested structured surfaces. The results of these measurements are summarized as follows:

TABLE 6

Measured Ridge Length per Area

| Sample | Ridge Length per Area (mm/mm$^2$) |
|---|---|
| 502-1 | 47.3 |
| 507-1 | 48.3 |
| 551-1 | 29.7 |
| 554-1 | 111.8 |
| 594-1 | 109.5 |
| 597-1 | 44.2 |
| 599-1 | 89.3 |
| 600-1 | 116.8 |
| 502-2 | 32.3 |
| 551-2 | 18.8 |
| 554-2 | 35.2 |
| 593-2 | 36.4 |
| 597-2 | 1.1 |
| 600-2 | 0.1 |
| N3 | 50.5 |
| L27B | 0.3 |
| RA24a | 0.2 |
| RA13a | 0.0 |
| SDB diffuser | 2.2 |
| CCS diffuser | 4.4 |
| DPB diffuser | 244.8 |

In reviewing the results of Table 6, we see that all or most of the non-beaded samples made by the method of FIG. 9 have structured surfaces characterized by a total ridge length per unit area in plan view of less than 200 mm/mm$^2$, and less than 150 mm/mm$^2$, and in a range from 10 to 150 mm/mm$^2$.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible.

Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the disclosed transparent conductive articles may also include an anti-reflective coating and/or a protective hard coat. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The following are exemplary embodiment according to the present disclosure:

Item 1. An optical film, comprising:
  a birefringent substrate;
  a prismatic layer carried by the substrate, the prismatic layer having a major surface comprising a plurality of side by side linear prisms extending along a same prism direction; and
  an embedded structured surface disposed between the substrate and the prismatic layer comprising closely-packed structures arranged such that ridges are formed between adjacent structures, the structures being limited in size along two orthogonal in-plane directions;
  wherein the embedded structured surface has a topography characterizable by a first and second Fourier power spectrum associated with respective first and second orthogonal in-plane directions, and wherein
    to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak, and
    to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak; and
  wherein the embedded structured surface is characterized by a total ridge length per unit area in plan view of less than 200 mm/mm²

Item 2. The film of item 1, wherein the embedded structured surface separates two optical media that differ in refractive index by at least 0.05.

Item 3. The film of item 1, wherein the total ridge length per unit area is less than 150 mm/mm².

Item 4. The film of item 1, wherein the first peak ratio is less than 0.5 and the second peak ratio is less than 0.5.

Item 5. The film of item 1, wherein the closely-packed structures are characterized by equivalent circular diameters (ECDs) in plan view, and wherein the structures have an average ECD of less than 15 microns.

Item 6. The film of item 5, wherein the structures have an average ECD of less than 10 microns.

Item 7. The film of item 1, wherein the prism direction and one of the first and second orthogonal in-plane directions are the same.

Item 8. The film of item 1, wherein at least some of the closely-packed structures comprise curved base surfaces.

Item 9. The film of item 8, wherein most of the closely-packed structures comprise curved base surfaces.

Item 10. The film of item 9, wherein all of the closely-packed structures comprise curved base surfaces.

Item 11. An optical film, comprising:
  a birefringent substrate;
  a prismatic layer carried by the substrate, the prismatic layer having a major surface comprising a plurality of side by side linear prisms extending along a same prism direction; and
  an embedded structured surface disposed between the substrate and the prismatic layer comprising closely-packed structures, the embedded structured surface defining a reference plane and a thickness direction perpendicular to the reference plane;
  wherein the embedded structured surface has a topography characterizable by a first and second Fourier power spectrum associated with respective first and second orthogonal in-plane directions, and wherein
    to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak, and
    to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak; and
  wherein the closely-packed structures are characterized by equivalent circular diameters (ECDs) in the reference plane and mean heights along the thickness direction and wherein an aspect ratio of each structure equals the mean height of the structure divided by the ECD of the structure; and wherein an average aspect ratio of the structures is less than 0.15.

Item 12. The film of item 11, wherein the embedded structured surface is characterized by a total ridge length per unit area in plan view of less than 200 mm/mm².

Item 13. The film of item 12, wherein the total ridge length per unit area is less than 150 mm/mm².

Item 14. The film of item 11, wherein the closely-packed structures are characterized by equivalent circular diameters (ECDs) in plan view, and wherein the structures have an average ECD of less than 15 microns.

Item 15. The film of item 14, wherein the structures have an average ECD of less than 10 microns.

Item 16. The film of item 11, wherein at least some of the closely-packed structures comprise curved base surfaces.

Item 17. The film of item 16, wherein most of the closely-packed structures comprise curved base surfaces.

Item 18. The film of item 17, wherein all of the closely-packed structured comprise curved base surfaces.

Item 19. An optical film, comprising:
  a birefringent substrate;
  a prismatic layer carried by the substrate, the prismatic layer having a major surface comprising a plurality of side by side linear prisms extending along a same prism direction; and
  an embedded structured surface disposed between the substrate and the prismatic layer comprising closely-packed structures having curved base surfaces;
  wherein the embedded structured surface has a topography characterizable by a first and second Fourier power spectrum associated with respective first and second orthogonal in-plane directions, and wherein
    to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
    to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak; and
  wherein the embedded structured surface provides an optical haze of less than 95%.

Item 20. The film of item 19, wherein the embedded structured surface provides an optical haze of less than 90%

Item 21. The film of item 20, wherein the embedded structured surface provides an optical haze of less than 80%

Item 22. The film of item 19, wherein the embedded structured surface is characterized by a total ridge length per unit area in plan view of less than 200 mm/mm$^2$.

Item 23. The film of item 19, wherein the first peak ratio is less than 0.5 and the second peak ratio is less than 0.5.

Item 24. The film of item 19, wherein the closely-packed structures are characterized by equivalent circular diameters (ECDs) in plan view, and wherein the structures have an average ECD of less than 15 microns.

Item 25. The film of item 24, wherein the structures have an average ECD of less than 10 microns.

Item 26. An optical film, comprising:
  a birefringent substrate;
  a prismatic layer carried by the substrate, the prismatic layer having a major surface comprising a plurality of side by side linear prisms extending along a same prism direction; and
  an embedded structured surface disposed between the substrate and the prismatic layer comprising closely-packed structures;
  wherein the embedded structured surface has a topography characterizable by a first and second Fourier power spectrum associated with respective first and second orthogonal in-plane directions, and wherein
    to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
    to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak; and
  wherein the embedded structured surface provides an optical haze in a range from 10 to 60% and an optical clarity in a range from 10 to 40%.

Item 27. The film of item 26, wherein the embedded structured surface is characterized by a total ridge length per unit area in plan view of less than 200 mm/mm$^2$.

Item 28. The film of item 26, wherein the first peak ratio is less than 0.5 and the second peak ration is less than 0.5.

Item 29. The film of item 26, wherein the closely-packed structures are characterized by equivalent circular diameters (ECDs) in plan view, and wherein the structures have an average ECD of less than 15 microns.

Item 30. The film of item 29, wherein the structures have an average ECD of less than 10 microns.

Item 31. An optical film, comprising:
  a birefringent substrate;
  a prismatic layer carried by the substrate, the prismatic layer having a major surface comprising a plurality of side by side linear prisms extending along a same prism direction; and
  an embedded structured surface disposed between the substrate and the prismatic layer comprising larger first structures and smaller second structures, the first and second structures both being limited in size along two orthogonal in-plane directions;
  wherein the first structures are non-uniformly arranged on the embedded structured surface;
  wherein the second structures are closely packed and non-uniformly dispersed between the first structures; and
  wherein an average size of the first structures is greater than 15 microns and an average size of the second structures is less than 15 microns.

Item 32. The film of item 31, wherein the average size of the first structures is in a range from 20 to 30 microns.

Item 33. The film of item 31, wherein the average size of the second structures is in a range from 4 to 10 microns.

Item 34. The film of item 31, wherein the embedded structured surface is characterized by a bimodal distribution of equivalent circular diameter (ECD) of structures of the embedded structured surface, the bimodal distribution having a first and second peak, the larger first structures corresponding to the first peak and the smaller second structures corresponding to the second peak.

Item 35. An optical film, comprising:
  a birefringent substrate;
  a prismatic layer carried by the substrate, the prismatic layer having a major surface comprising a plurality of side by side linear prisms extending along a same prism direction; and
  an embedded structured surface disposed between the substrate and the prismatic layer, wherein the embedded structured surface is made by microreplication from a tool structured surface, the tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

What is claimed is:

1. An optical film, comprising:
   a birefringent substrate;
   a prismatic layer carried by the substrate, the prismatic layer having a major surface comprising a plurality of side by side linear prisms extending along a same prism direction; and
   an embedded structured surface disposed between the substrate and the prismatic layer comprising closely-packed structures arranged such that ridges are formed between adjacent structures, the structures being limited in size along two orthogonal in-plane directions;
   wherein the embedded structured surface has a topography characterizable by a first and second Fourier power spectrum associated with respective first and second orthogonal in-plane directions, and wherein
      the first Fourier power spectrum includes one or more first frequency peak not corresponding to zero frequency and being bounded by two adjacent valleys that define a first baseline, each first frequency peak having a first peak ratio of less than 0.8, the first peak ratio being equal to an area between the first frequency peak and the first baseline divided by an area beneath the first frequency peak, and
      the second Fourier power spectrum includes one or more second frequency peak not corresponding to zero frequency and being bounded by two adjacent valleys that define a second baseline, each second frequency peak having a second peak ratio of less than 0.8, the second peak ratio being equal to an area between the second frequency peak and the second baseline divided by an area beneath the second frequency peak; and
   wherein the embedded structured surface is characterized by a total ridge length per unit area in plan view of less than 200 mm/mm².

2. The optical film of claim 1, wherein the embedded structured surface separates two optical media that differ in refractive index by at least 0.05.

3. The optical film of claim 1, wherein the closely-packed structures are characterized by equivalent circular diameters (ECDs) in plan view, and wherein the structures have an average ECD of less than 15 microns.

4. The optical film of claim 1, wherein the prism direction and one of the first and second orthogonal in-plane directions are the same.

5. The optical film of claim 1, wherein at least some of the closely-packed structures comprise curved base surfaces.

6. An optical film, comprising:
   a birefringent substrate;
   a prismatic layer carried by the substrate, the prismatic layer having a major surface comprising a plurality of side by side linear prisms extending along a same prism direction; and
   an embedded structured surface disposed between the substrate and the prismatic layer comprising closely-packed structures, the embedded structured surface defining a reference plane and a thickness direction perpendicular to the reference plane;
   wherein the embedded structured surface has a topography characterizable by a first and second Fourier power spectrum associated with respective first and second orthogonal in-plane directions, and wherein
      the first Fourier power spectrum includes one or more first frequency peak not corresponding to zero frequency and being bounded by two adjacent valleys that define a first baseline, each first frequency peak having a first peak ratio of less than 0.8, the first peak ratio being equal to an area between the first frequency peak and the first baseline divided by an area beneath the first frequency peak, and
      the second Fourier power spectrum includes one or more second frequency peak not corresponding to zero frequency and being bounded by two adjacent valleys that define a second baseline, each second frequency peak having a second peak ratio of less than 0.8, the second peak ratio being equal to an area between the second frequency peak and the second baseline divided by an area beneath the second frequency peak; and
   wherein the closely-packed structures are characterized by equivalent circular diameters (ECDs) in the reference plane and mean heights along the thickness direction and wherein an aspect ratio of each structure equals the mean height of the structure divided by the ECD of the structure; and
   wherein an average aspect ratio of the structures is less than 0.15.

7. The optical film of claim 6, wherein the embedded structured surface is characterized by a total ridge length per unit area in plan view of less than 200 mm/mm².

8. The optical film of claim 6, wherein at least some of the closely-packed structures comprise curved base surfaces.

9. The optical film of claim 6, wherein the structures have an average ECD of less than 15 microns.

10. The optical film of claim 6, wherein the structures have an average ECD of less than 10 microns.

11. An optical film, comprising:
    a birefringent substrate;
    a prismatic layer carried by the substrate, the prismatic layer having a major surface comprising a plurality of side by side linear prisms extending along a same prism direction; and
    an embedded structured surface disposed between the substrate and the prismatic layer comprising closely-packed structures having curved base surfaces;
    wherein the embedded structured surface has a topography characterizable by a first and second Fourier power spectrum associated with respective first and second orthogonal in-plane directions, and wherein
       the first Fourier power spectrum includes one or more first frequency peak not corresponding to zero frequency and being bounded by two adjacent valleys that define a first baseline, each first frequency peak having a first peak ratio of less than 0.8, the first peak ratio being equal to an area between the first frequency peak and the first baseline divided by an area beneath the first frequency peak; and
       the second Fourier power spectrum includes one or more second frequency peak not corresponding to zero frequency and being bounded by two adjacent valleys that define a second baseline, each second frequency peak having a second peak ratio of less than 0.8, the second peak ratio being equal to an area between the second frequency peak and the second baseline divided by an area beneath the second frequency peak; and wherein the embedded structured surface provides an optical haze of less than 95%.

12. The optical film of claim 11, wherein the embedded structured surface is characterized by a total ridge length per unit area in plan view of less than 200 mm/mm².

13. The optical film of claim 11, wherein the closely-packed structures are characterized by equivalent circular diameters (ECDs) in plan view, and wherein the structures have an average ECD of less than 15 microns.

14. The optical film of claim 13, wherein the structures have an average ECD of less than 10 microns.

15. The optical film of claim 11, wherein the embedded structured surface is characterized by a total ridge length per unit area in plan view of less than 200 mm/mm².

16. An optical film, comprising:
a birefringent substrate;
a prismatic layer carried by the substrate, the prismatic layer having a major surface comprising a plurality of side by side linear prisms extending along a same prism direction; and
an embedded structured surface disposed between the substrate and the prismatic layer comprising closely-packed structures;
wherein the embedded structured surface has a topography characterizable by a first and second Fourier power spectrum associated with respective first and second orthogonal in-plane directions, and wherein
the first Fourier power spectrum includes one or more first frequency peak not corresponding to zero frequency and being bounded by two adjacent valleys that define a first baseline, each first frequency peak having a first peak ratio of less than 0.8, the first peak ratio being equal to an area between the first frequency peak and the first baseline divided by an area beneath the first frequency peak; and
the second Fourier power spectrum includes one or more second frequency peak not corresponding to zero frequency and being bounded by two adjacent valleys that define a second baseline, each second frequency peak having a second peak ratio of less than 0.8, the second peak ratio being equal to an area between the second frequency peak and the second baseline divided by an area beneath the second frequency peak; and wherein the embedded structured surface provides an optical haze in a range from 10 to 60% and an optical clarity in a range from 10 to 40%.

17. The optical film of claim 16, wherein the embedded structured surface is characterized by a total ridge length per unit area in plan view of less than 200 mm/mm².

18. The optical film of claim 16, wherein the closely-packed structures are characterized by equivalent circular diameters (ECDs) in plan view, and wherein the structures have an average ECD of less than 15 microns.

19. The optical film of claim 18, wherein the structures have an average ECD of less than 10 microns.

20. The optical film of claim 16, wherein the first peak ratio is less than 0.5 and the second peak ratio is less than 0.5.

* * * * *